United States Patent
Robertson et al.

(10) Patent No.: US 12,044,522 B2
(45) Date of Patent: Jul. 23, 2024

(54) SYSTEMS AND METHODS FOR CREATING DUPLICATE KEYS

(71) Applicant: iKeyless, LLC, Louisville, KY (US)

(72) Inventors: Douglas Robertson, Crestwood, KY (US); Adam Pizer, Louisville, KY (US); David Horsfall, Eldwick (GB); Ian Simon Smith, Willenhall (GB)

(73) Assignee: IKEYLESS, LLC, Louisville, KY (US)

( * ) Notice: Subject to any disclaimer, the term of this patent is extended or adjusted under 35 U.S.C. 154(b) by 378 days.

(21) Appl. No.: 17/169,252

(22) Filed: Feb. 5, 2021

(65) Prior Publication Data

US 2021/0237175 A1    Aug. 5, 2021

Related U.S. Application Data

(60) Provisional application No. 62/970,661, filed on Feb. 5, 2020.

(51) Int. Cl.
*G01B 11/25* (2006.01)
*B23C 3/35* (2006.01)
*B23Q 35/40* (2006.01)
*E05B 19/00* (2006.01)

(52) U.S. Cl.
CPC ............ *G01B 11/2518* (2013.01); *B23C 3/35* (2013.01); *B23Q 35/40* (2013.01); *E05B 19/0011* (2013.01); *B23C 2235/41* (2013.01)

(58) Field of Classification Search
CPC ... G07C 9/00857; G07C 9/38; G06F 16/9558; B23Q 35/40; G01B 11/2518; B23C 3/35; B23C 2235/41; E05B 19/0011
See application file for complete search history.

(56) References Cited

U.S. PATENT DOCUMENTS

| | | |
|---|---|---|
| 2,582,012 A | 1/1952 | Currier |
| 3,323,420 A | 6/1967 | Roxburgh |
| 3,413,892 A | 12/1968 | Casey |
| 3,442,174 A | 5/1969 | Weiner et al. |
| 3,796,130 A | 3/1974 | Gartner |
| 4,889,391 A | 12/1989 | Cornelius |
| 4,899,391 A | 2/1990 | Cimino et al. |
| 5,127,532 A | 7/1992 | Cimino et al. |
| 5,677,682 A | 10/1997 | Thorsen |
| 5,771,176 A | 6/1998 | Froehlich |

(Continued)

FOREIGN PATENT DOCUMENTS

| | | | |
|---|---|---|---|
| DE | 102004006734 A1 | 9/2005 | |
| EP | 3967970 A1 * | 3/2022 | ............ G01B 11/24 |

*Primary Examiner* — Tri T Ton
*Assistant Examiner* — Jarreas Underwood
(74) *Attorney, Agent, or Firm* — Gray Ice Higdon

(57) ABSTRACT

The present invention generally relates to the field of replicating or copying keys. More specifically, the present invention relates to creating a copy of a master key based on a captured image of the master key by using a laser scanning of the master key and decoding the master key based on the captured image. The present invention identifies a set of target key information based on the image of the master key to provide for the cutting of a duplicate key blade copy using a key scanning and cutting system located at a retail or end location. Additional key information may also be captured along with the image of the master key.

15 Claims, 12 Drawing Sheets

(56) References Cited

U.S. PATENT DOCUMENTS

| | | |
|---|---|---|
| 5,807,042 A | 9/1998 | Almblad et al. |
| 5,908,273 A | 6/1999 | Titus |
| 6,065,911 A * | 5/2000 | Almblad .................. B23C 3/35 |
| | | 409/83 |
| 6,152,662 A | 11/2000 | Titus et al. |
| 6,175,638 B1 | 1/2001 | Yanovsky |
| 6,185,311 B1 | 2/2001 | Yanovsky et al. |
| 6,406,227 B1 | 6/2002 | Titus et al. |
| 6,449,381 B1 | 9/2002 | Yanovsky |
| 6,543,972 B1 | 4/2003 | Cimino |
| 6,588,995 B2 | 7/2003 | Wills et al. |
| 6,647,308 B1 | 11/2003 | Prejean et al. |
| 6,836,553 B2 | 12/2004 | Campbell et al. |
| 6,839,451 B2 | 1/2005 | Campbell et al. |
| 6,895,100 B1 | 5/2005 | Pacenzia et al. |
| 7,768,377 B2 | 8/2010 | Brey |
| 7,890,878 B2 | 2/2011 | Bass et al. |
| 7,891,919 B2 | 2/2011 | Bass et al. |
| 8,128,322 B2 | 3/2012 | Bass et al. |
| 8,287,215 B2 | 10/2012 | Freeman et al. |
| 8,532,809 B2 | 9/2013 | Freeman |
| 8,626,331 B2 | 1/2014 | Marsh et al. |
| 8,634,655 B2 | 1/2014 | Thompson et al. |
| 8,634,665 B2 | 1/2014 | Fukuhara |
| 8,634,951 B2 | 1/2014 | Freeman |
| 8,644,619 B2 | 2/2014 | Thompson et al. |
| 8,682,468 B2 | 3/2014 | Marsh et al. |
| 8,965,794 B2 | 2/2015 | Bass et al. |
| 8,979,446 B2 | 3/2015 | Freeman |
| 8,985,918 B2 | 3/2015 | Bass et al. |
| 8,992,145 B1 | 3/2015 | Mueller et al. |
| 9,101,990 B2 | 8/2015 | Mutch et al. |
| 9,199,318 B2 | 12/2015 | Freeman et al. |
| 9,269,136 B2 | 2/2016 | Day et al. |
| 9,308,590 B2 | 4/2016 | Bass et al. |
| 9,323,237 B2 | 4/2016 | Freeman |
| 9,323,884 B2 | 4/2016 | Overman et al. |
| 9,468,982 B1 | 10/2016 | Mueller et al. |
| 9,514,385 B2 | 12/2016 | Thompson et al. |
| 9,556,649 B1 | 1/2017 | Mueller et al. |
| 9,558,236 B1 | 1/2017 | Hagen et al. |
| 9,563,885 B2 | 2/2017 | Marsh et al. |
| 9,582,734 B2 | 2/2017 | Thompson et al. |
| 9,656,332 B2 | 5/2017 | Bass et al. |
| 9,682,432 B2 | 6/2017 | Mutch et al. |
| 9,687,920 B2 | 6/2017 | Bass et al. |
| 9,808,900 B2 | 11/2017 | Gardner et al. |
| 9,815,126 B2 | 11/2017 | Bass et al. |
| 9,818,041 B2 | 11/2017 | Mutch et al. |
| 9,895,753 B2 | 2/2018 | Huss |
| 9,914,179 B2 | 3/2018 | Freeman et al. |
| 9,925,601 B2 | 3/2018 | Mutch et al. |
| 9,934,448 B2 | 4/2018 | Thompson et al. |
| 9,950,375 B2 | 4/2018 | Burkett et al. |
| 9,963,908 B2 | 5/2018 | Bass et al. |
| 9,987,715 B2 | 6/2018 | Gardner et al. |
| 10,010,949 B2 | 7/2018 | Hagen et al. |
| 10,013,833 B2 | 7/2018 | Blalock et al. |
| 10,018,982 B2 | 7/2018 | Chambers et al. |
| 10,068,401 B1 | 9/2018 | Blalock et al. |
| 10,252,392 B2 | 4/2019 | Gardner et al. |
| 10,421,133 B2 | 9/2019 | Bass et al. |
| 10,480,214 B2 | 11/2019 | Bass et al. |
| 10,482,439 B2 | 11/2019 | Freeman |
| 2001/0033781 A1 * | 10/2001 | Wills .................. B23C 3/35 |
| | | 269/142 |
| 2009/0228795 A1 | 9/2009 | Bass |
| 2011/0297691 A1 | 12/2011 | Freeman |
| 2011/0301738 A1 | 12/2011 | Freeman |
| 2012/0243957 A1 | 9/2012 | Drake et al. |
| 2013/0138243 A1 | 5/2013 | Freeman |
| 2013/0170693 A1 | 7/2013 | Marsh |
| 2013/0173044 A1 | 7/2013 | Marsh |
| 2013/0204423 A1 | 8/2013 | Overman |
| 2013/0331976 A1 | 12/2013 | Freeman |
| 2014/0377027 A1 | 12/2014 | Burkett et al. |
| 2015/0050094 A1 | 2/2015 | Gerlings |
| 2016/0114412 A1 | 4/2016 | Bosch |
| 2016/0321632 A1 | 11/2016 | Moore et al. |
| 2016/0375503 A1 | 12/2016 | Bass et al. |
| 2017/0039447 A1 | 2/2017 | Mutch et al. |
| 2017/0193327 A1 * | 7/2017 | Thompson ............. G01B 11/22 |
| 2017/0225242 A1 | 8/2017 | Spangler |
| 2018/0046881 A1 | 2/2018 | Mutch et al. |
| 2018/0065226 A1 | 3/2018 | Gardner et al. |
| 2018/0079014 A1 | 3/2018 | Marsh |
| 2018/0079015 A1 | 3/2018 | Marsh et al. |
| 2018/0154459 A1 | 6/2018 | Freeman |
| 2018/0204089 A1 | 7/2018 | Thompson et al. |
| 2018/0207733 A1 | 7/2018 | Mutch et al. |
| 2018/0232983 A1 | 8/2018 | Blalock et al. |
| 2018/0250785 A1 | 9/2018 | Gardner et al. |
| 2018/0264561 A1 | 9/2018 | Schmidt |
| 2018/0335520 A1 * | 11/2018 | Tofte ...................... G01S 17/88 |
| 2020/0002975 A1 * | 1/2020 | Grice .................... H04N 23/74 |
| 2020/0013241 A1 | 1/2020 | Johnson |
| 2022/0196392 A1 * | 6/2022 | Xi .......................... G01B 11/24 |

\* cited by examiner

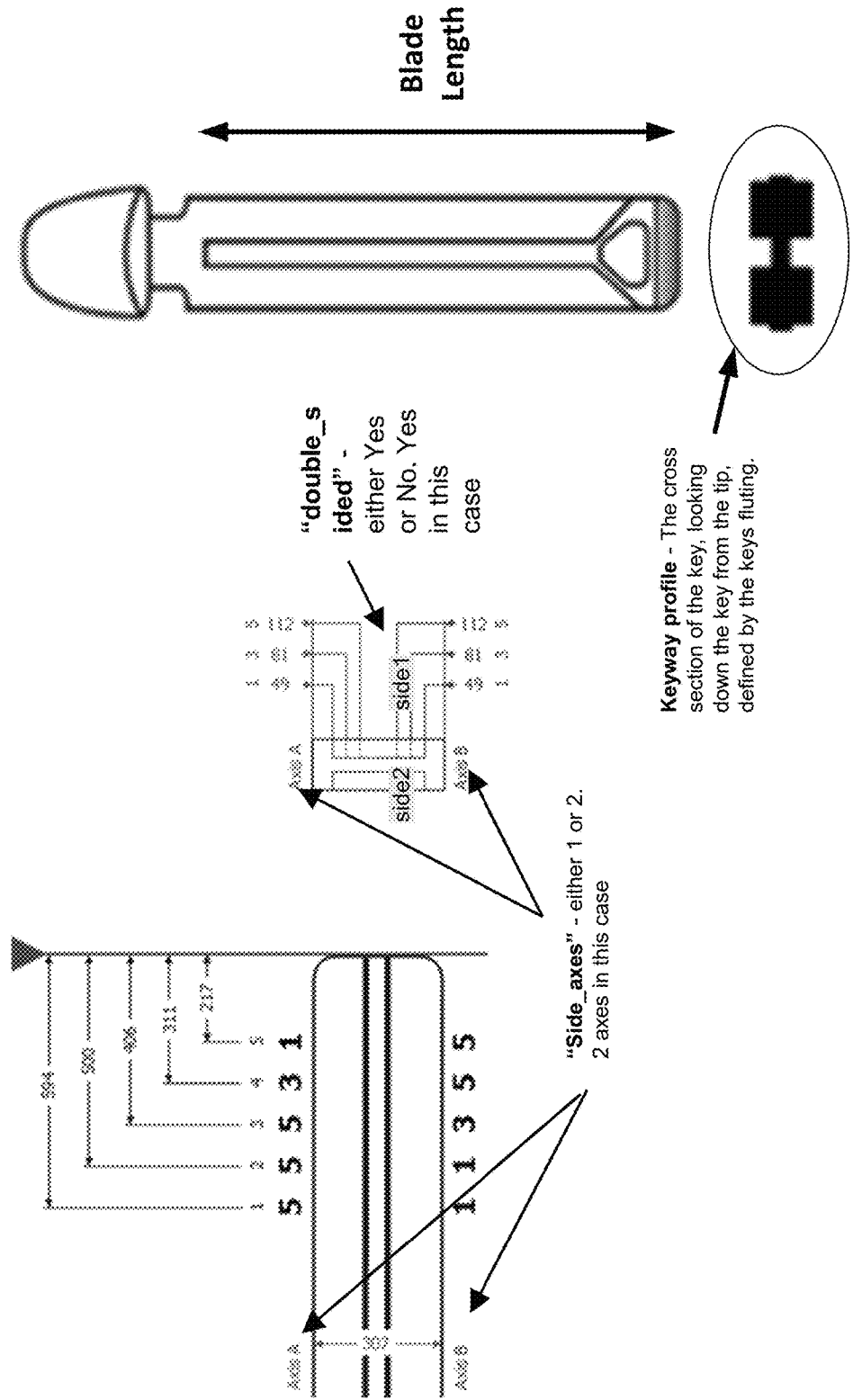

SYSTEMS AND METHODS FOR CREATING DUPLICATE KEYS

CROSS-REFERENCE TO RELATED APPLICATION

The present invention claims the benefit of priority to U.S. Prov. Pat. App. No. 62/970,661 filed Feb. 5, 2020, entitled SYSTEMS AND METHODS FOR CREATING DUPLICATE KEYS (Robertson et al.), which is incorporated by reference herein in its entirety.

FIELD OF INVENTION

The present invention generally relates to the field of replicating or copying keys. More specifically, the present invention relates to creating a copy of a master key based on a set of information captured from the master key. The present invention identifies a set of information derived from the master key to provide for the cutting of a duplicate key blade copy. Additional key information may also be captured along with the image of the master key.

BACKGROUND OF THE INVENTION

Remote Access systems for consumer vehicles have become a popular, if not essential, feature of most vehicles sold today. Nearly every vehicle on the market for the past several years has included some form of keyless entry as either a standard feature or add-on option. Consumers with older vehicles without remote access systems have been able to retrofit their vehicles with aftermarket systems.

The technologies behind these systems have evolved rapidly with remote systems moving from low security fixed codes with simple transmission schemes to high security encrypted rolling codes with advanced transmission protocols. Developers of these systems, both original equipment manufacturer ("OEM") and aftermarket, have been constantly refining and improving their offerings to take advantage of improvements in technology. Over time, the numerous designs and platforms, coupled with rapidly changing security technologies, have resulted in a great variety of remote devices and systems that are almost universally incompatible across vehicle brands or makes and even between different year and models of vehicles.

In addition to the programming tools and software for pairing modern car keys, remotes, remote access devices, or key fobs with a vehicle, locksmiths must provide key blades that come in many types and shapes depending on the manufacturer's requirements for the ignition cylinder. Modern blades are typically milled as opposed to traditional grinding wheel approaches. These special cutting tools are also very expensive.

Problems exist in the identification of the bitting patterns and other information related to the type, shape, contour, and other characteristics related to the key blade for a master key to be copied. Specifically, issues exist in properly identifying the exact shape of the key blade, compensating for wear or damage to the key blade, verifying that the key blade being examined matches a key blank to be copied, verifying that the bitting pattern observed or determined from a master key is a valid pattern, and in cutting a key copy from a blank based on information gathered from a master key. Such issues include issues with the positioning of the master key relative to an information gathering system, such as a camera, and may include parallax, shadows, foreshortening, and blurriness of a captured image.

Specifically, with keys such as residential house keys, which normally have a relatively flat profile, the house key may be placed flat on a surface when it is to be scanned or imaged to capture information related to the key. A process such as single laser scanning may be used to capture the key information for the house key. This process is typically efficient and accurate when the position and orientation of the key to be captured are known and can be pre-programmed or designed for in a key duplication system. For example, scaling and laser positioning for a laser-based image capture device, or focus and zoom distance for a (charge couple device) CCD-type photo sensor image capture device having a lens, can be calibrated to an exact or known distance between a laser or camera and a scanning surface, which may be a glass surface such as a glass plate. This process typically provides accuracy for sending the laser or camera to an optimum position to generate a (three-dimension) 3D profile, cut depth and/or bitting information, and decoding measurements related to the house key being captured by the image capturing apparatus of the key copying device.

However, for keys such as vehicle keys, car keys, key blades with an attached remote or key fob, or novelty or designer keys, the exact distance and positioning of the key blade relative to the scanning surface and to the image capture device cannot accurately be known or determined with existing systems. Inaccurate, incorrect or unknowable information introduces errors or discrepancies into the information captured by the image capture device and as determined by the key duplication system resulting in a point of failure.

What is needed is a system and method for effectively and accurately capturing information from a master key to be copied. What is needed is a system that can correct for issues typically present in the capture of information related to a master key that is not ideally positioned relative to an image capture device.

SUMMARY OF THE INVENTION

The present invention provides a system and method for capturing data from a master key to be copied in a key copying process and for decoding the information captured from the master key to determine a set of characteristics, such as key blade type, cut depth, bitting information, and key decoding measurements for the master key to be used in the cutting of a duplicate key from a key blank.

Relative to the capturing and decoding of information related to typical residential keys, the capturing and decoding of information related to vehicle keys, car keys, key blades with an attached remote or key fob, or novelty or designer keys (generally referred to herein as "vehicle keys") introduces a number of problems, among other improvements and solutions, that are solved by the system and method of the present invention. With vehicle keys, when the key blade is positioned on a scanning surface, such as a scanning glass, for an image of and information related to the key blade to be captured by an image capture device, such as a camera, laser, or camera and laser imaging system, the size, shape, contours and/or dimensions of the vehicle key or its remote or fob may prevent the key from being optimally positioned on the scanning surface.

Some vehicle keys may be suspended above the surface of the glass by the head of the key, the fob, or remote as shown in FIG. 1. When the vehicle key, which is the master key to be copied, is placed on the scanning surface it may not be possible using the key outline or silhouette of the key blade to determine if the key is actually raised above the glass. In this situation, the key blade would be closer to the camera than the imaging device, which may be a laser scanner, would be expecting. This also causes the key blade to appear larger to the camera and would result in incorrect measurements of the key blade. The laser in a laser scanner would miss a targeted spot on the key blade by the same distance that the key blade is positioned above the glass. The laser scanner may miss the widest part of the key blade and capture an incomplete 3D profile of the key blade where there is a deep cut or bit or where there are no grooves in the key blade.

A vehicle key may also be pitched at an angle relative to the imaging device or the scanning surface as shown in FIG. 2. For other keys, such as house keys, a camera takes a number of images, such as 64 images, of the laser stripe from the laser as it moves 5 mm over the key blade. The number of images captured by the camera is variable and may be reduced to increase cycle time or increased for a noise reduction effect. The distance moved over the key blade (e.g., 5 mm) is variable and the distance moved is determined by either taking an average of the width of the key blade or choosing the widest point on the key blade. Higher resolution cameras may scan a shorter distance. The speed of the laser scan is synchronized to appear shifted one pixel-width between consecutive exposures. When the scan is complete, the system offsets each image a required number of pixels and stacks the images with the laser lines exactly on top of one another. This process improves the signal to noise ratio. However, a key blade, such as a key blade from a vehicle key, that is pitched relatively up or down on the scanning surface will cause the laser to appear to travel slower or faster over the key blade as captured by the camera. For example, blades pitching at an angle cause the laser to miss the desired target and the laser appears to scan over a shorter distance than expected and the blade would also appear foreshortened. As shown in FIG. 2, blade 22 is shown in a flat position relative to the scanning surface while blade 22' is shown pitched relative to the scanning surface at a pitch angle 20. One difference in the scans and associated measurements varying when blade is in flat position 20 vs pitched position 22' is that the former will have a distance between scans of D2 while the latter would have a shorter distance between scans of D1. The time between camera exposures when the key blade is pitched relative to the scanning surface will no longer be synchronized with the distance between pixels. If the key blade is pitched, the stacking of the images of the key blade would cause a blurred line or silhouette. Pitching and/or other alignment issues compromise, or render ineffective, matching the captured key features with a key blank or other information in a database. Specifically, the perspective effects captured by the camera or imaging device will cause the key blade to appear wider where it is nearer (higher) to the camera compared to where it is further (lower) from the camera. The key blade will also appear foreshortened in length.

Issues with the alignment and angle of the key blade cause problems with laser targeting that compromise proper identification of key blade features and bitting information, such as shown in FIG. 3 where the laser would miss the desired target but still have the correct scanning distance. Key blade measurements and decoding will be incorrect if scanned using a single laser scanning method.

To solve these problems associated with imaging the key blade of a vehicle key, the present invention provides a scanning system and method that corrects the targeting of the laser to provide for high quality, or "sharp", imaging of a key including the capturing of a 3D profile of the key blade. The system and method of the claimed invention uses a three step, or triple-laser scanning process to accurately capture a high quality, clear image for a 3D profile and a distortion corrected 2D outline of the key blade of a master key to be copied.

Additionally, once an image of the key has been captured by the triple-laser scanning process, the 3D profile or image of the key must be decoded to determine the key bitting information to be used in cutting a replacement or copy key from a key blank. The decoded information is also used to determine if the copy key is cut "by trace" or cut "by code". A key is cut "by code" if it can be cut using standard cut depths at each key bitting position based on original equipment manufacturer ("OEM") key bitting specifications. If the decoded key does not match OEM specification, such as is caused by wear on the key blade or damage to the key blade, the key may instead be cut "by trace" based on the 3D profile or image of the key blade of the master key.

The laser scanning system and method and key decoding system and method of the claimed invention may further be used in a system for creating replacement keys using a key scanning and cutting system. The system takes multiple scans, e.g., three, using one or more lasers to address key alignment issues. The system may be a retail system wherein a customer brings a master key to be copied to a retail location where a key scanning and cutting system is located. The customer, assisted by an employee or entirely by the employee, operates the key scanning and cutting system by placing the master key in the system, navigating a series of menu options presented in a graphical user interface by operating one or more user interface elements which may include physical user inputs on the key scanning and cutting system, and obtaining the copied key based on the master key.

Replacement or duplicate keys may directly replicate or emulate all features of the vehicle OEM key or may include additional features unique to a universal remote head key ("URHK"). A URHK is a universal key that combines a keyfob/keyless entry system, transponder, and key blade into a single unit that may be programmed and configured to operate with a wide range of vehicle makes and models. URHKs and the systems and methods for programming them are described in U.S. patent application Ser. No. 14/165,922, filed Jan. 28, 2014 (113083.001US1)(patented as U.S. Pat. No. 10,115,255) entitled METHOD AND APPARATUS FOR IMPLEMENTING MULTI-VENDOR ROLLING CODE KEYLESS ENTRY SYSTEMS (Johnson et al.), which is incorporated by reference herein in its entirety. Methods and systems for dongle-based key pairing and programming are described in U.S. patent application Ser. No. 16/947,892 filed Aug. 23, 2020 (113083.010US2), entitled SYSTEM AND METHOD FOR PAIRING A KEY WITH A VEHICLE VIA A VEHICLE COMMUNICATIONS PORT BY A DONGLE (Johnson et al.), which is incorporated herein by reference in its entirety. Replacement or duplicate keys and related information may be stored in a "key bank" such as described in U.S. patent application Ser. No. 16/153,602, filed Oct. 5, 2018 (113083.009US1), and entitled SYSTEMS AND METHODS FOR CREATING KEY BACKUPS BY IDENTIFYING AND STORING UNIQUE KEY INFORMATION IN A KEY BANK AND FOR REPLICATING UNIQUE KEYS FROM KEY BANK BACKUPS (Johnson et al.), which is incorporated herein by reference in its entirety. Another system for processing information related to master keys for duplicating is described in U.S. patent application Ser. No. 16/898,251 filed Jun. 10, 2020 (113083.014US1), entitled SYSTEMS AND METHODS FOR CREATING REPLACEMENT VEHICLE KEYS (Determan et al.), which is incorporated by reference herein in its entirety. An additional system for providing key duplication processing information related to master keys for duplicating is described in U.S. Provisional Patent App. 62/970,419 filed Feb. 5, 2020 (113083.018PRV), entitled SYSTEMS AND METHODS FOR CREATING REPLACEMENT VEHICLE KEYS (Determan et al.), which is incorporated by reference herein in its entirety.

Retail and commercial machines for the copying of residential keys may include many automatic or semi-automatic systems. Several such systems and methods are described in at least U.K. Patent Application No. 201809157, filed Jun. 5, 2018, entitled KEY BLANK DISPENSING SYSTEM (Horsfall et al.); in U.K. Patent Application No. 201806414, filed Apr. 19, 2018, entitled KEYS (Horsfall); in U.K. Patent Application No. 201708957, filed Jun. 6, 2017, entitled KEY BLANK DISPENSING SYSTEM (Horsfall et al.); in U.K. Patent Application No. 201509700, filed Jun. 4, 2015, entitled IMPROVEMENTS IN OR RELATING TO KEY CUTTING AND KEY CUTTING APPARATUS (Horsfall et al.); in U.K. Patent Application No. 201607933, filed May 6, 2016, entitled IMPROVEMENTS IN OR RELATING TO KEY CUTTING AND KEY CUTTING APPARATUS (Horsfall et al.); in U.S. patent application Ser. No. 16/567,912, filed Sep. 11, 2019, entitled KEY CUTTING APPARATUS (Horsfall et al.); and in U. K. Design Application Nos. 4039724 and 4039725, entitled "MY KEY MACHINE Devices; Mikey the Robot Device" (Horsfall), each of which are incorporated by reference herein in their entirety.

Further systems and methods from using a laser or light stripe generating device for use in key cutting processes are described in U.S. Pat. No. 6,065,911, issued May 23, 2000, entitled METHOD AND APPARATUS FOR AUTOMATICALLY MAKING KEYS, which is incorporated by reference herein in its entirety.

A first embodiment of the present invention provides a method for making duplicate keys comprising the following steps: receiving on a scannable surface a physical "master" key having a key blade; capturing image data of the master key; targeting a laser and projecting at least one laser line on the master key key blade based at least in part on captured image data; determining a set of measurements including distance and height measurements related to the master key and the projected laser lines; based on the determined set of measurements, determining a pitch angle of the master key key blade relative to the scannable surface; and targeting the laser and projecting a further laser line based at least in part on the set or measurements and the pitch angle.

The first embodiment of the present invention may be further characterized in one or more of the following: wherein capturing image data comprises capturing a first image of the master key and determining a predetermined location of the master key; and wherein targeting a laser comprises based on the first image, targeting a laser at the predetermined location of the master key key blade and projecting a first laser line on the master key key blade; wherein capturing image data comprises capturing a first sequence of images of the projected first laser line on the master key key blade; and wherein determining a set of measurements comprises determining by a processor a first horizontal distance from an end tip of the master key key blade to the projected first laser line, the end tip being distal to the predetermined location and determining by the processor a first blade height of the master key key blade; wherein targeting a laser and projecting at least one laser line on the master key key blade comprises targeting by the laser, based at least in part on the first horizontal distance and the first blade height, a second location on the master key key blade and projecting a second laser line on the master key key blade, wherein the second location is either a point half-way between the first laser line and the tip of the key blade or a point half-way between the first laser line and the predetermined location; wherein capturing image data comprises capturing a second sequence of images of the projected second laser line on the master key key blade; and wherein determining a set of measurements comprises determining a second horizontal distance from the end tip of the master key key blade to the second laser line and determining a second blade height of the master key key blade based on the second laser line; wherein determining a pitch angle of the master key key blade relative to the scannable surface comprises is based upon the first horizontal distance, the first blade height, the second horizontal distance, and the second blade height; wherein targeting the laser and projecting a further laser line based at least in part on the set or measurements and the pitch angle comprises targeting by the laser, based at least in part on the first and second horizontal distances, the first and second blade heights, and the pitch angle, a third location on the master key key blade and projecting a third laser line on the master key key blade; further comprising moving the third laser line along the length of the master key key blade and capturing a third sequence of images of the projected third laser line on the master key key blade; wherein for the third sequence of images an apparent distance moved between each captured image is corrected to about 1 pixel between exposures or image captures; further comprising generating a three-dimensional profile of the master key key blade; wherein targeting the laser and projecting a further laser line comprises controlling a speed of movement of the further laser line based on the determined pitch angle; further comprising correcting distorted image data and simulating sliding pins over cuts in the master key key blade; further comprising determining an optimum position for decoding and decoding the master key key blade at a determined best slide position; further comprising decoding both sides of a master key key blade, applying a best fit line, sum errors from applying best fit line to determine a score, and determine which side has the lowest error score; further comprising comparing the lowest error score to a pass/fail value and determine whether to cut a key blank to trace or to code.

The first embodiment of the invention may be further characterized in one or more of the following ways: capturing an optimum area by or near a predetermined location, e.g., the head or shoulder, of the master key key blade; wherein the laser is a line laser; the first and second sequences of images are relatively short and/or quick sequence compared to the third sequence of images; wherein the laser does not move or change position relative to the key blade or to the scanning surface to ensure that the line produced by the laser on the key blade stays at a constant height on the key above the glass scanning surface and that the line does not become blurred when the individual images in the set of images are combined or "stacked" to generate a 3D profile of the key blade of the master key; targeting a fourth point on the key blade may also be selected if the point half-way between the first laser line and the tip of the key blade or half-way between the first laser line and the key blade predetermined location are not suitable for a particular key blade, which may be further determined based on the greater of the two distances to provide for higher accuracy in the scanning process; wherein the number of images to be captured at the first, second and third sequences is determined based on a consideration of cycle time and image noise reduction; wherein the third laser line moves over the key blade and the camera or image capture device captures a series or set of 64 images of the third laser line on the key blade for a third laser scan; wherein the speed and movement of the laser line over the key blade is controlled based on a calculation derived from the earlier measurements and determined pitch angle; wherein the speed and movement is set to ensure that the apparent distance moved between each captured image is set to prevent blurring of the third laser line; wherein a clear, sharp 3D profile of the key blade of the master key is generated based upon the captured images and may be used for identification of the master key based upon a comparison of images previously stored in a key database or for adding to a key database; further comprising a reduction process for each point of a determined outline of the master key, the size of the outline may be reduced based on the determined height as derived from a function of distance from the tip of the key; further comprising a stretching process for each point of a determined outline of the master key, the length of the key may be increased based on the foreshortening and derived using the determined pitch angle of the blade.

A second embodiment of the present invention provides a laser-based key cutting machine for making duplicate keys, the key cutting machine comprising: a master key imaging compartment having a scannable surface configured to receive and support a master key having a key blade for imaging; an imaging device disposed proximate to the scannable surface and positioned to capture image data of the master key key blade; a laser disposed proximate to the scannable surface and positioned to direct a laser line on the master key key blade; a processor and a memory having stored therein instructions executable by the processor, wherein the processor is adapted to send and receive signals to the imaging device and laser; a set of non-transitory instructions stored in the memory and configured, when executed by the processor, to: target a laser and project at least one laser line on the master key key blade based at least in part on captured image data; determine a set of measurements including distance and height measurements related to the master key and the projected laser lines; based on the determined set of measurements, determine a pitch angle of the master key key blade relative to the scannable surface; and target the laser and project a further laser line based at least in part on the set or measurements and the pitch angle; and a key cutting component configured to receive a signal from the processor and cut a key blank based on a set of master key bitting information included in the signal.

The second embodiment of the present invention may be further characterized in one or more of the following: wherein the set of non-transitory instructions is further configured, when executed by the processor, to: cause the imaging device to capture a first set of master key key blade image data; determine, based on the first set of master key key blade image data, a predetermined location of the master key; and based on the first set of master key key blade image data, cause the laser to target the predetermined location of the master key key blade and project a first laser line on the master key key blade; cause the imaging device to capture a first sequence of images of the projected first laser line on the master key key blade; and determine a first horizontal distance from an end tip of the master key key blade to the projected first laser line, the end tip being distal to the predetermined location and determining by the processor a first blade height of the master key key blade; cause the laser to target a second location on the master key key blade, based at least in part on the first horizontal distance and the first blade height, and project a second laser line on the master key key blade, wherein the second location is either a point half-way between the first laser line and the tip of the key blade or a point half-way between the first laser line and the predetermined location; cause the imaging device to capture a second sequence of images of the projected second laser line on the master key key blade; and determine a second horizontal distance from the end tip of the master key key blade to the second laser line and determining a second blade height of the master key key blade based on the second laser line; determine a pitch angle of the master key key blade relative to the scannable surface based upon the first horizontal distance, the first blade height, the second horizontal distance, and the second blade height; and cause the laser to: target, based at least in part on the first and second horizontal distances, the first and second blade heights, and the pitch angle, a third location on the master key key blade; project a third laser line on the master key key blade; and move the third laser line along the length of the master key key blade; and cause the imaging device to capture a third sequence of images of the projected third laser line on the master key key blade; cause the laser to project a laser line at a determined speed of movement based on the determined pitch angle; decode both sides of a master key key blade, apply a best fit line, sum errors from applying best fit line to determine a score, and determine which side has the lowest error score; compare the lowest error score to a pass/fail value and determine whether to cut a key blank to trace or to a key code based on a set of OEM key code data stored on a lookup table accessible by the processor.

In a third embodiment the invention provides a method for decoding a scanned image of a key blade comprising one or more of the following steps: receiving a distortion-corrected image of a key blade of a master key to be copied (such as may be captured and produced by the method of the first embodiment described above); analyzing the distortion-corrected image, wherein the distortion-corrected image of the key blade represents cuts on both sides of the master key key blade; simulating sliding virtual lock pins over cuts in the master key key blade; accommodating at least 40% of the average cut spacing for cuts or bittings in a master key key blade; sliding, in an incremental fashion, the virtual pins a short distance before the center of each key blade cut; sliding or moving the virtual pins through centers of key blade cuts and stopping movement of the virtual pins after the virtual pins have passed through the centers of the key blade; analyzing each cut in the key blade at each sliding increment as the virtual pins move from the original position at one side of the center of the cuts on the key blade, through the centers, and to the other side of the centers; cutting each cut in small steps or increments from −0.5*flat width of the key to up to +0.5*flat width of the key from the center of the virtual pin; determining for low long (distance or length) each of the small steps remains horizontal and when the incrementing through the steps is complete for a single cut storing the maximum horizontal line length; repeating for each cut or bit on the key blade.

The third embodiment may be further characterized in one or more of the following steps or features: storing a value for each sliding increment where the value may be deriving by determining a sum of the maximum value for each cut for a particular sliding increment; sliding the pins incrementally and determining a new value for each incremental location for all of the cuts on the key blade; determining an optimum or best position for decoding a set of features which may be a set of key cut depths or bitting information, wherein the optimum position is where the sum of the maximum cut horizontal measurements is the greatest of all the measured slide increments for the virtual pins as the pins are moved through the centers of each cut on the key blade; decoding the key blade at the optimum position; decoding both sides of the key blade using the information determined; wherein decoding fails on any one side of the key blade if any measured depth falls outside of a predetermined range where +35% of an allowable cut depth is too high and −45% of an allowable cut depth is too deep; wherein the cut depths as measured for the key blade of the master key have the depth for an OEM key subtracted from them to obtain a set of scores; wherein a set of scores where each score is "0" would be ideal and would indicate a direct match to an OEM key as determined by an OEM key code; wherein the OEM key code comprises a set of measurements for a key blade; wherein the OEM key code may be, for example, the key cut depths or bitting information for each cut position on one or both sides of a key blade; determining whether to cut by code or by trace may be based in part on whether or not an OEM key code can be identified for comparison to the master key to be copied; wherein known OEM key codes are used to determine a set of maximum cut depth differences or specific cut depths for every cut position on a key blade; wherein there are a predetermined or set number of key codes for any particular OEM key, and these codes may be used to cut, correct, or reject a decoded key for cutting; wherein there may be only a subset of key codes in an OEM key code range that represent actual "valid" key codes that would be used in cutting an OEM key; wherein this information can be further used to rule out invalid codes, key cut depths, or bitting information determined for a master key; further comprising a best fit line applied to the differences in the key cut or bitting depths for the key blade of the master key from a "perfect" line for an OEM key as determined by an OEM key code; wherein the best fit line is used to generate or determine a set of errors including the accuracy of fit, skew angle, and shift bias; wherein the set of errors are summed together to determine a final score for the decoded key; further comprising determining the side of the key blade with the lowest error score by comparing the final error scores for each side of the key blade is identified; wherein the side with the lowest error score is compared to a predetermined pass/fail value; further comprising decoding of the key fails if both sides of the key blade have at least cut being determined to be too deep or too high or if neither of the sides of the key have an error less than the predetermined pass/fail value; further comprising cutting a copy key or replacement key based on either the decoded key value if one side of the master key as decoded has a final score or error value under the predetermined pass/fail value, or on a trace of the master key if neither side of the master key as decoded has a final score or error value under the predetermined pass/fail value.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIGS. 12-14 provide various views of exemplary key types having various sets of key features and showing key cutting spacings and parameters in association with operation of the key cutting system of the present invention.

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Also, while the exemplary embodiments describe use of lasers, this is not limiting to the invention and one possessing ordinary skill in the art would understand the invention may be used in connection with other suitable means of presenting accurate and repeatable "lines" or "stripes" onto key structures discernable by a camera in connection with the processes described in detail hereinbelow. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
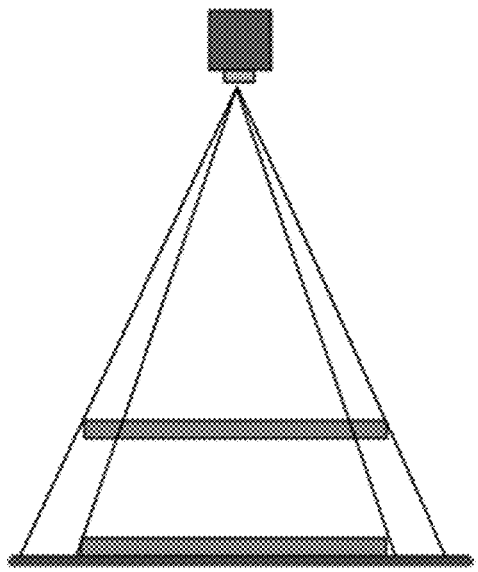
FIGS. 1-3 provide view of problems with prior art single-laser scanning systems for imaging key blades.
Figure 2:
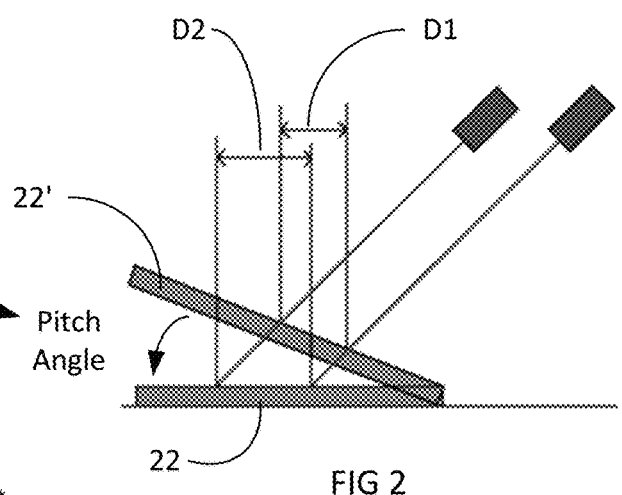
Figure 3:
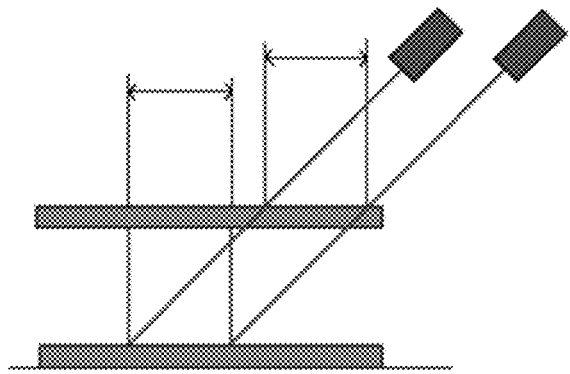
Figure 4:
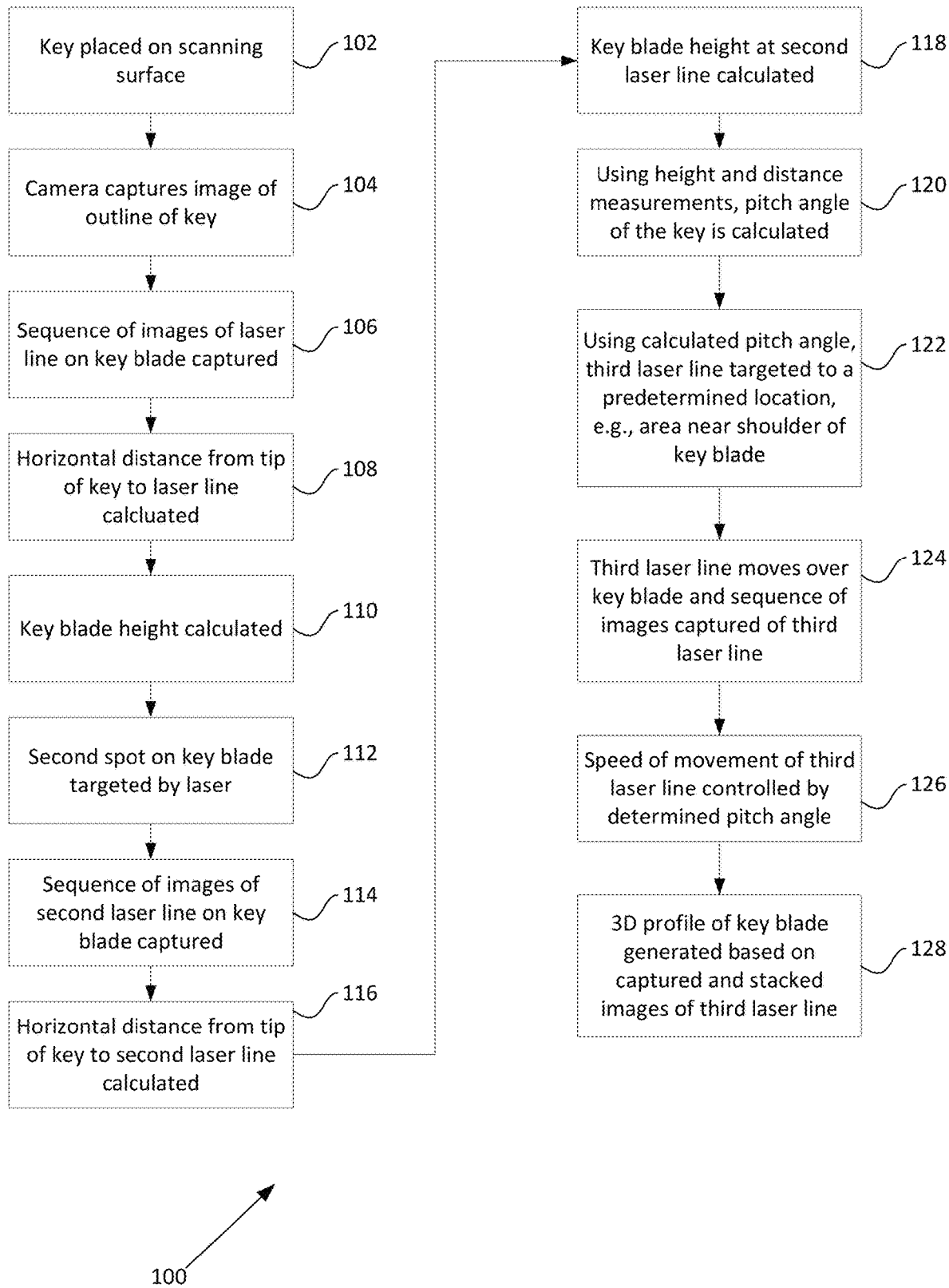
FIGS. 4-5 provide a series of flowcharts illustrating an exemplary process for scanning a key blade and decoding the scanned image of the key blade according to the present invention.

With reference to FIG. 4, a flowchart illustrating an exemplary process 100 for scanning an image of a key blade is provided. The process 100 is used by a key scanning and cutting system, such as a system that may be located in a retail location such as an auto parts or hardware store, or at a hub location. Process 100 starts in step 102 with a physical key, which may be a master key such as a vehicle key, being placed on a scanning surface such as a glass surface. The entire master key including the head, shoulder, shank, key blade, tip, and any fob, transponder, and/or remote will be placed on the scanning surface.

It is important to note that different key types have different key features and characteristics. See the exemplary key types included at FIGS. 12-14. Keys that have shoulders are generally "shoulder-biased" keys and the key blade length is measured or determined from the key tip to the shoulder or bottom of the key shank. Keys that do not include a shank or a shoulder are generally "tip-biased" and the blade length is measured or determined from the bottom of the key head to the key tip. Complicating things further, although an original master key, e.g., the original OEM key provided with a new vehicle, is essentially identical in configuration to an OEM master key blank configuration, there may be a range of configurations that differ in some respect to this master configuration, e.g., although the key blade is a common length, the shank or portion of the key blade outside the bitting or cut area may be different lengths. Accordingly, it is important in key cutting to identify and determine precise points or features for cutting a bitting set of cuts on a duplicate key blade. Herein the system described will identify one or more "predetermined location(s)" based on the master key known or observed or based on user inputs and may consult a database of known OEM or supplier key codes and types. For example, a laser may target a predetermined location on a master key blade or duplicate key blank that is a feature or a known distance from a feature, e.g., shoulder location, distance from key tip, key head, proximity to the cut closest to the head or distal to the key tip.

Typically, placing the master key on the scanning surface will involve sliding out a drawer having a glass plate or glass bottom, or opening a door to a space or cabinet within the key scanning and cutting system and then placing the key onto the scanning surface and closing the drawer or door. In step 104 a camera or imaging device captures an image of an outline of the master key. A laser and a camera in the key scanning and cutting system are typically calibrated and focused to a distance based on the location or height of the scanning surface (e.g., a glass surface). The laser targets a location near the shoulder of the key blade of the master key.

After this point has been targeted, in step 106 a sequence of images of the laser line on the key blade of the master key are captured. This may be a relative short and/or quick sequence comprising capturing a set of images, for example 24 images, of a first laser line from the laser on the key blade of the master key. Determining the number of images to be captured requires a trade-off between cycle time and image noise reduction. In this step, the laser does not move or change position relative to the key blade or to the scanning surface. This ensures that the line produced by the laser on the key blade stays at a constant height on the key above the glass scanning surface and that the line does not become blurred when the individual images in the set of images are combined or "stacked" to generate a 3D profile of the key blade of the master key.

In step 108 the horizontal distance from the tip of the key blade of the master key to the laser line is calculated and in step 110 a blade height for the key blade is calculated by the key scanning and cutting system. Based at least in part on these calculations, in step 112 a second spot on the key blade is targeted by the laser in the key scanning and cutting system. The second point will be either a point half-way between the first laser line and the tip of the key blade or half-way between the first laser line and the key blade shoulder. Another point on the key blade may also be selected if the point half-way between the first laser line and the tip of the key blade or half-way between the first laser line and the key blade shoulder are not suitable for a particular key blade. This is determined based on the greater of the two distances to provide for higher accuracy in the scanning process. In step 114 images of the second laser line are captured in a manner similar to the first laser line. For example, a set of 24 images of the second laser line may be captured. Determining the number of images to be captured requires a trade-off between cycle time and image noise reduction.

In step 116 the horizontal distance from the tip of the key blade of the master key to the second laser line is calculated and in step 118 a blade height for the key blade based on the second laser line is calculated by the key scanning and cutting system. In step 120, based upon the distance determined in step 108, the height determined in step 110, the distance determined in step 116, and the height determined in step 118, a pitch angle of the key blade relative to the scanning surface is determined by the key scanning and cutting system. In step 122, based upon the determined pitch angle, a third laser scan is performed which is targeted with a high degree of accuracy based upon the previous measurements and on the determined pitch angle. This scan can capture an optimum area by or near the shoulder of the key blade of the master key.

In step 124 the third laser line for the third laser scan moves over the key blade and the camera or image capture device captures a series or set of, for example 64, images of the third laser line on the key blade. Determining the number of images to be captured requires a trade-off between cycle time and image noise reduction. In step 126 the speed and movement of the laser line over the key blade is controlled based on a calculation derived from the earlier measurements and determined pitch angle. The speed and movement is set to ensure that the apparent distance moved between each captured image is corrected back to within 1 pixel between exposures or image captures. Performing this type of correction prevents blurring of the third laser line. In step 128 a clear, sharp 3D profile of the key blade of the master key is generated based upon the captured images and may be used for identification of the master key based upon a comparison of images previously stored in a key database or for adding to the database.

The process 100 is used to correct for issues caused by height and perspective effects in an image of the key blade of a master key caused by the key blade being pitched or raised relative to a scanning surface. The different heights calculated at two known horizontal distances on the key blade, as determined by the first and second laser line scans, are used to perform a third, more accurate laser line scan of the key blade. Additionally, one or more post-processing techniques may be applied to the captured image or set of images to improve the determination of a set of features, including at least a set of key cut depths or bitting information, for the key blade of the master key.

First, a reduction process may be applied. In the reduction process, for each point of the determined outline of the key, the size of the outline may be reduced based on the determined height as derived from a function of distance from the tip of the key. This is because points nearer the camera or imaging device may appear relatively too large. Second, a stretching process may be applied. In the stretching process, for each point of the determined outline of the key, the length of the key may be increased based on the foreshortening and derived using the determined pitch angle of the blade. This is because points foreshortened appear to be shorter than they actually are. The outline is then corrected and can be measured and decoded accurately, such as in the process 200 shown in FIG. 5 and as described below.

Figure 5:
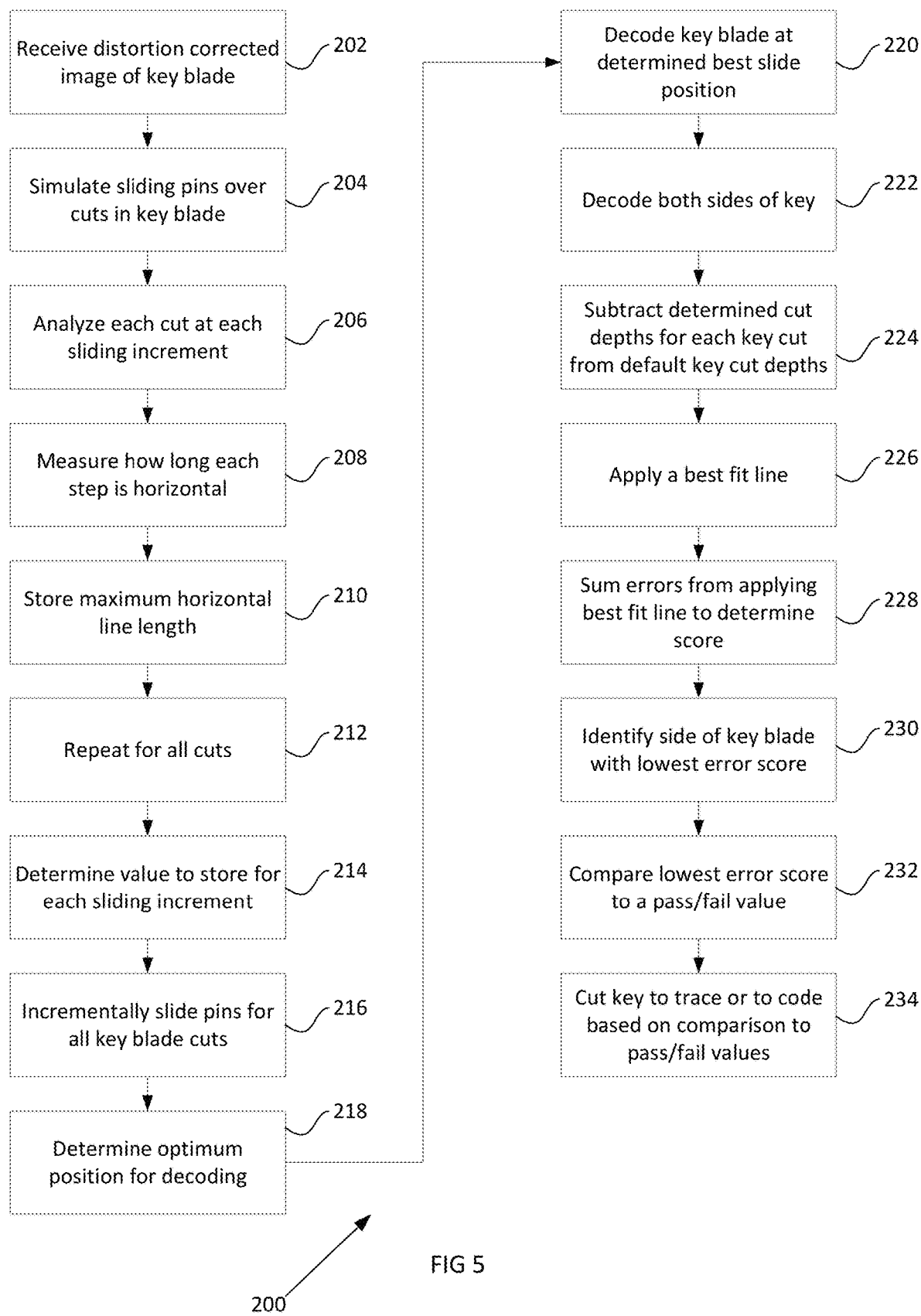

With reference to FIG. 5, a flowchart illustrating an exemplary process 200 for decoding a scanned image of a key blade is provided. The process 200 begins by receiving a distortion corrected image of a key blade of a master key to be copied, such as may be captured and produced by the process 100 described above. The key scanning and cutting system analyzes the distortion corrected image produced by the triple-laser scanning process 100. The image received in step 202 is the distortion corrected image of the key blade showing cuts on both sides, such as the top and bottom or left and right, of the key blade.

In step 204, the key scanning and cutting system may use a special purpose computing module or computer code or computer software, stored in a non-transitory memory and executed by a processor, to simulate sliding virtual lock pins over the cuts in the key blade as provided in the distortion corrected image of the key blade. This process accommodates at least 40% of the average cut spacing for cuts or bittings in a key blade but may accommodate more or fewer cut spacings or bittings for certain key blade types. The process starts by sliding, in an incremental fashion, the virtual pins a short distance before the center of each key blade cut. The virtual pins are slid or moved through the centers of the key blade cuts and then the movement of the virtual pins is stopped after the virtual pins have passed through the centers of the key blade cuts.

In step 206, each cut in the key blade is analyzed at each sliding increment as the virtual pins move from the original position at one side of the center of the cuts on the key blade, through the centers, and to the other side of the centers. At each sliding increment, each cut in the key blade is examined in turn. Each cut is processed in small steps or increments from exactly −0.5*flat width of the key to up to +0.5*flat width of the key from the center of the virtual pin. In step 208, it is measured for low long (distance or length) each of the small steps remains horizontal. When the incrementing through the steps is complete for a single cut, in step 210 the maximum horizontal line length is stored and the process is repeated in step 212 for each cut or bit on the key blade.

In step 214, a value to store for each sliding increment is determined. This value may be deriving by determining a sum of the maximum value for each cut for a particular sliding increment. In step 216, the pins are slid incrementally and a new value is determined for each incremental location for all of the cuts on the key blade. In step 218, an optimum or best position for decoding a set of features which may be a set of key cut depths or bitting information is determined. The optimum position is where the sum of the maximum cut horizontal measurements is the greatest of all the measured slide increments for the virtual pins as the pins are moved through the centers of each cut on the key blade.

In step 220, the key blade is decoded at the optimum position. In step 222, both sides of the key blade are decoded using the information determined in steps 202-218. Decoding fails on any one side of the key blade if any measured depth falls outside of a predetermined range where +35% of an allowable cut depth is too high and −45% of an allowable cut depth is too deep. In step 224, the cut depths as measured for the key blade of the master key have the depth for an OEM key subtracted from them to obtain a set of scores. A set of scores where each score is "0" would be ideal and would indicate a direct match to an OEM key as determined by an OEM key code.

The OEM key code comprises a set of measurements for a key blade. The OEM key code may be, for example, the key cut depths or bitting information for each cut position on one or both sides of a key blade. Determining whether to cut by code or by trace may be based in part on whether or not an OEM key code can be identified for comparison to the master key to be copied. Known OEM key codes are used to determine a set of maximum cut depth differences or specific cut depths for every cut position on a key blade. There are a predetermined or set number of key codes for any particular OEM key, and these codes may be used to cut, correct, or reject a decoded key for cutting. For example, an OEM key may have a key series identified as 49000, wherein keys having a code between 49000 and 49999 would be within the key series range, and wherein the code represents each cut (e.g., 10 cuts) and the depth of each cut (e.g., one of four positions) on a key. Additionally, there may be only a subset of key codes in an OEM key code range that represent actual "valid" key codes that would be used in cutting an OEM key. This information can be further used to rule out invalid codes, key cut depths, or bitting information determined for a master key.

The primary validation data used is a lookup table of all valid bitting permutations, or "key codes" for the known key series. After each pass of the algorithm, a confidence value is calculated based on the bit error at each bit position as a function of the measured cut depth at that bit position and the cut depth associated to the bit value at that same position of the potential matching key code. For any pass of the algorithm, a falsely deciphered key code match is inherently unlikely as the number of key codes in any particular key series is a small subset of all possible permutations that can be generated from the full space of bitting. For example, key series "40000-49999" used on TOYOTA 5-cut high security keys has 10,000 key codes, out of 59,049 (10 bit positions, 3 depths) possible permutations. So, in this example, the probability of wrongly deciphering a series of key cuts as any key code is about 17%. The probability of a false match is further decreased by applying the previously described predetermined confidence value limit to every potential match and selecting the potential match with the highest confidence value.

A best fit line is then applied to the differences in the key cut or bitting depths for the key blade of the master key from a "perfect" line for an OEM key as determined by an OEM key code. The best fit line is used to generate or determine a set of errors including the accuracy of fit, skew angle, and shift bias. The set of errors are summed together to determine a final score for the decoded key.

In step 230 the side of the key blade with the lowest error score as determined by comparing the final error scores for each side of the key blade is identified. In step 232, the side with the lowest error score is compared to a predetermined pass/fail value. Decoding of the key fails if both sides of the key blade have at least cut being determined to be too deep or too high or if neither of the sides of the key have an error less than the predetermined pass/fail value. In step 234, a copy key or replacement key is cut based on either the decoded key value if one side of the master key as decoded has a final score or error value under the predetermined pass/fail value, or on a trace of the master key if neither side of the master key as decoded has a final score or error value under the predetermined pass/fail value.

Figure 6:
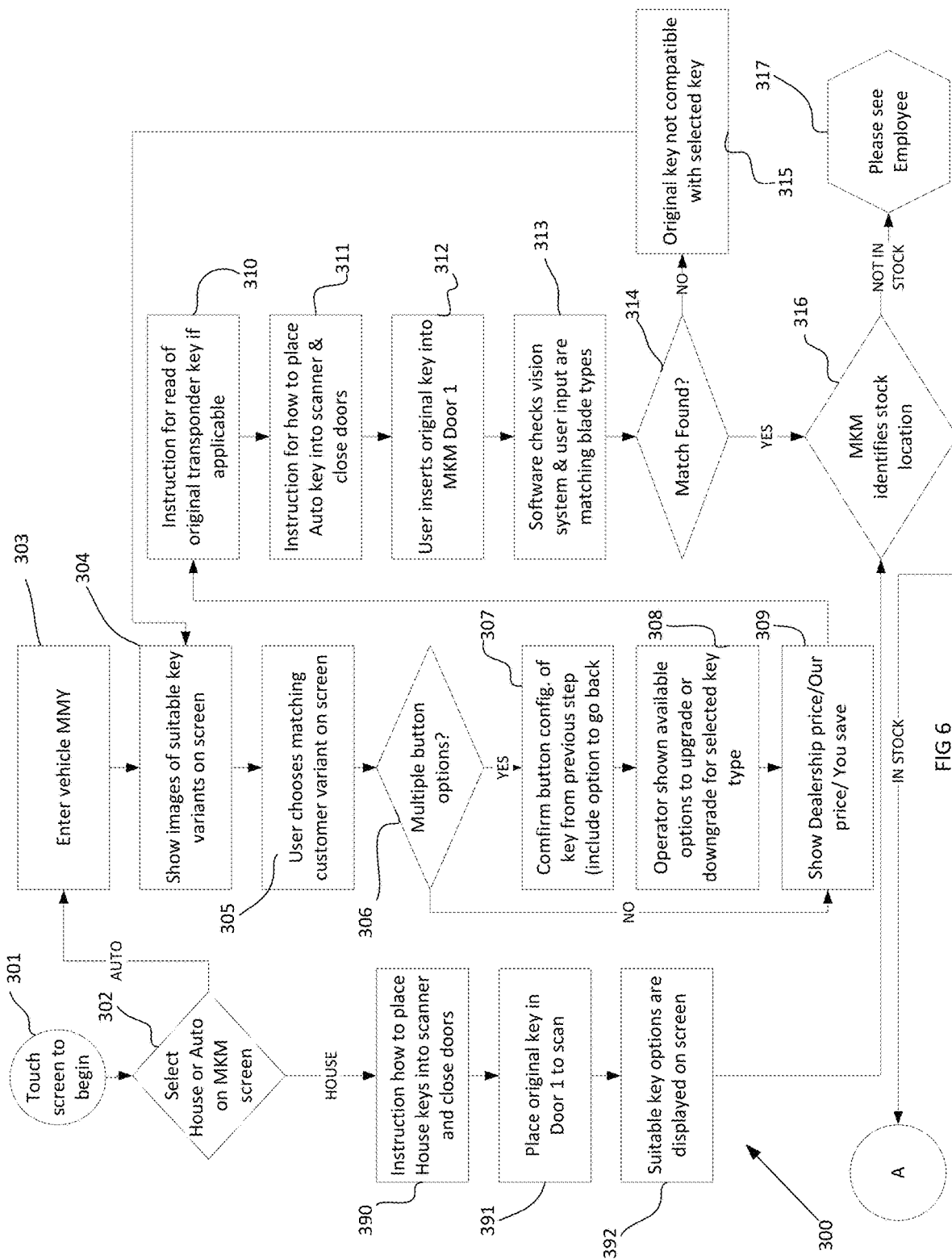
FIGS. 6-7 provide a series of flowcharts illustrating an exemplary process for a user ordering a replacement master key according to the present invention.
Figure 7:
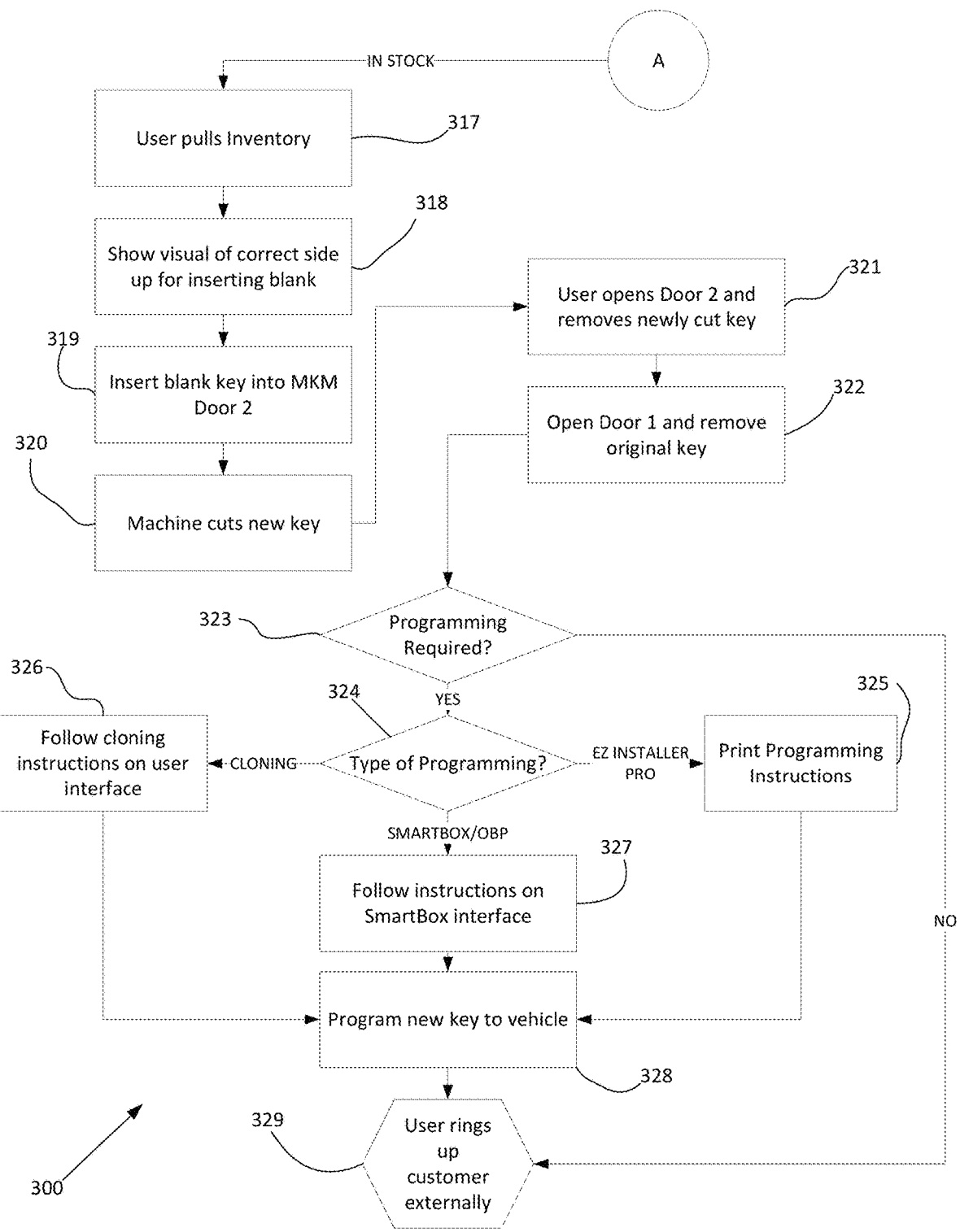

With reference to FIGS. 6-7, a series of flowcharts illustrating an exemplary process 300 for a user ordering a replacement master key according to the present invention. The process 300 involves a customer entering a location, such as a retail location for an auto parts or hardware store, and interacting with a key scanning and cutting system or with an employee/user who would operate the key scanning and cutting system. The key scanning and cutting system may be referred to as the "MY KEY MACHINE" or MKM system. In step 301 the customer interacts with a touch screen or other user interface element on a key scanning and cutting system to begin the process of obtaining a duplicate or copied key based on a customer supplied master key.

In step 302 the customer identifies whether or not the key is a "house" or "vehicle key" using the user interface of the key scanning and cutting system. If the key is a house key, in step 390 the user is presented with instructions on how to place their master key into a scanner of the key scanning and cutting system and to close the scanner doors. The scanner for the master key of the key scanning and cutting system may be an opening in a cabinet of the key scanning and cutting system that may be a drawer, sliding opening, or door that reveals a scanning surface that may be a glass scanning surface. In step 391 the customer places the original master key in the scanner of the key scanning and cutting system and closes the scanner door. After the key is scanned, suitable key options for obtaining a duplicate key are shown to the user in step 392 and the process proceeds to step 316.

If the customer's master key is an auto or vehicle key, the process proceeds to step 303 where the customer enters the vehicle make, model, and year ("MMY") associated with the customer's master key. In step 304, the customer is presented, via a display of the key scanning and cutting system, with images of suitable key variants for replacements or duplicates of the customer's master key based on the input MMY information. In step 305, the customer, or employee/user, selects a matching replacement key variant as shown in the display of the key scanning and cutting system.

In decision 306 it is determined if multiple key fob or remote button configurations or options exist for the master key. For example, valet keys, transponder keys, simple key fobs, and complex, multi-button remotes may all exist for any given MMY of vehicle. If there are no options, in step 309 the customer is shown a comparison of the cost of obtaining a duplicate or key copy from a vehicle dealer compared to obtaining one from the key scanning and cutting system at the retail location. If multiple button options exist, in step 307 a selected button configuration or key option as selected in step 305 is confirmed and the customer or employee/user is further presented with an option to return to step 305. The employee/user or customer of the key scanning and cutting system in step 308 is presented with options that may be available to upgrade the selected replacement key. For example, if the customer has a simple transponder key and a full smart key remote exists as a replacement, the customer or employee/user may be able to select the upgraded smart key instead of the transponder key for their master key type.

In step 310, if the master key is a transponder key the employee/user is presented with instructions via the display of the key scanning and cutting system for reading the transponder information from the transponder master key. In step 311 the employee/user is presented with instructions via the display of the key scanning and cutting system for placing the vehicle master key in a scanning area of the key scanning and cutting system and how to close the scanning area doors. In step 312 the customer or employee/user inserts the original vehicle master key into the scanning area of the key scanning and cutting system and closes the scanning area doors. In step 313 the key scanning and cutting system captures and processes images of the master key and determines, such as by the process 100 and 200 shown in FIGS. 4 and 5, if the employee/user inputs related to the master key type match a master key type as determined by the key scanning and cutting system comparing the processed images of the master key to images or key codes in a database accessible by the key scanning and cutting system.

In decision 314, if a match is not found, in step 315 it is determined that the original master key is not compatible with the selected key type and the process returns to step 304. If a match is found, in decision 316 the key scanning and cutting system identifies a stock location for a key blank to be used in creating a duplicate or copy key from the customer's master key. If there is no key blank or key stock available, the customer is informed to contact an employee in step 317 for additional options. If the key blank or key stock are available, the process 300 continues at A in FIG. 7.

Continuing from FIG. 6, in step 317 the employee/user locates and retrieves a key blank or key stock from an inventory of key blanks or stock. The key blanks or stock may be kept in a series of vertical or horizontal drawers on a set of hooks, pegs, baskets, or other suitable storage means arranged in a grid or other pattern for simple identification and retrieval. In step 318, the employee/user is shown which side of the key blank or stock should be inserted into the key scanning and cutting system facing upwards for cutting of the key blade of the key blank. In step 319 the employee/user inserts the key blank or stock into a key cutting area of the key scanning and cutting system, which may be a drawer or other opening in the key scanning and cutting system for receiving the key blank or stock for cutting.

In step 320, the key scanning and cutting system cuts a replacement or copy key based on the information, such as key code, trace, or bitting information, derived from the customer's master key. In step 321, the employee/user opens a door or drawer to the key cutting area of the key scanning and cutting system and removes or obtains the newly cut replacement or copy key that was cut based on the customer's master key.

In decision 323 it is determined if programming of the replacement key is required for a transponder, key fob, or remote key. If programming is not required, in step 329 the customer completes a transaction to purchase the replacement key. If programming is required, in decision 324 the type of programming required is determined. If the key can be cloned, in step 326 the customer or employee/user is prompted to follow a set of instructions presented on the user interface of the key scanning and cutting system for cloning the master key. If an EZ INSTALLER PRO is required, in step 325 a set of programming instructions are displayed or printed for the user for pairing or programming the replacement key with the user's vehicle. If a SMARTBOX/OBP is required, in step 327 the customer or employee/user is prompted to follow a set of instructions on the SMARTBOX user interface for pairing or programming the replacement key. In step 328 the replacement key is programmed and/or paired with the customer's vehicle and in step 329 the customer completes a transaction to purchase the replacement key.

Figure 8:
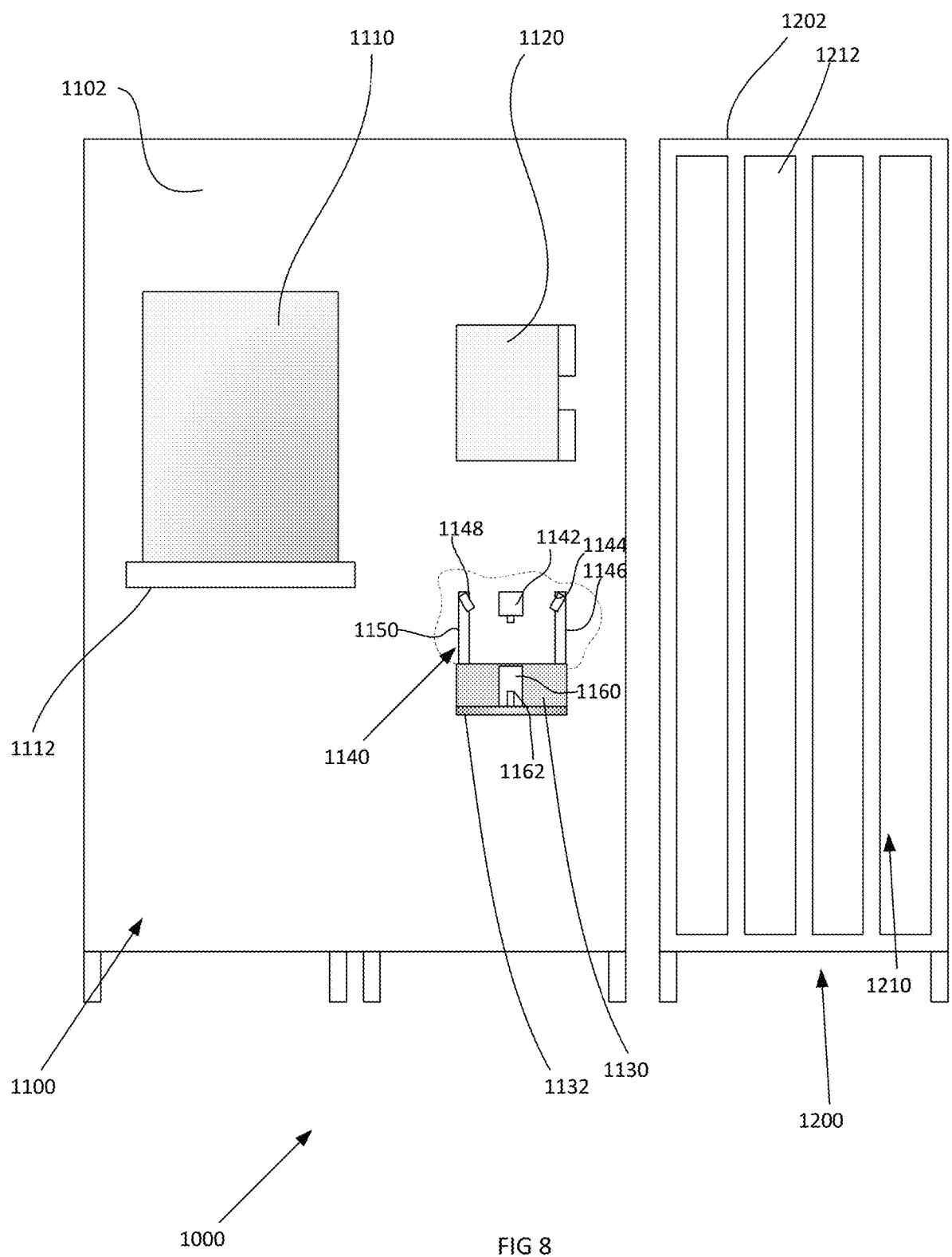
FIGS. 8-9 provide front and perspective views of elements of an embodiment of a key scanning and cutting system according to the present invention.
Figure 9:
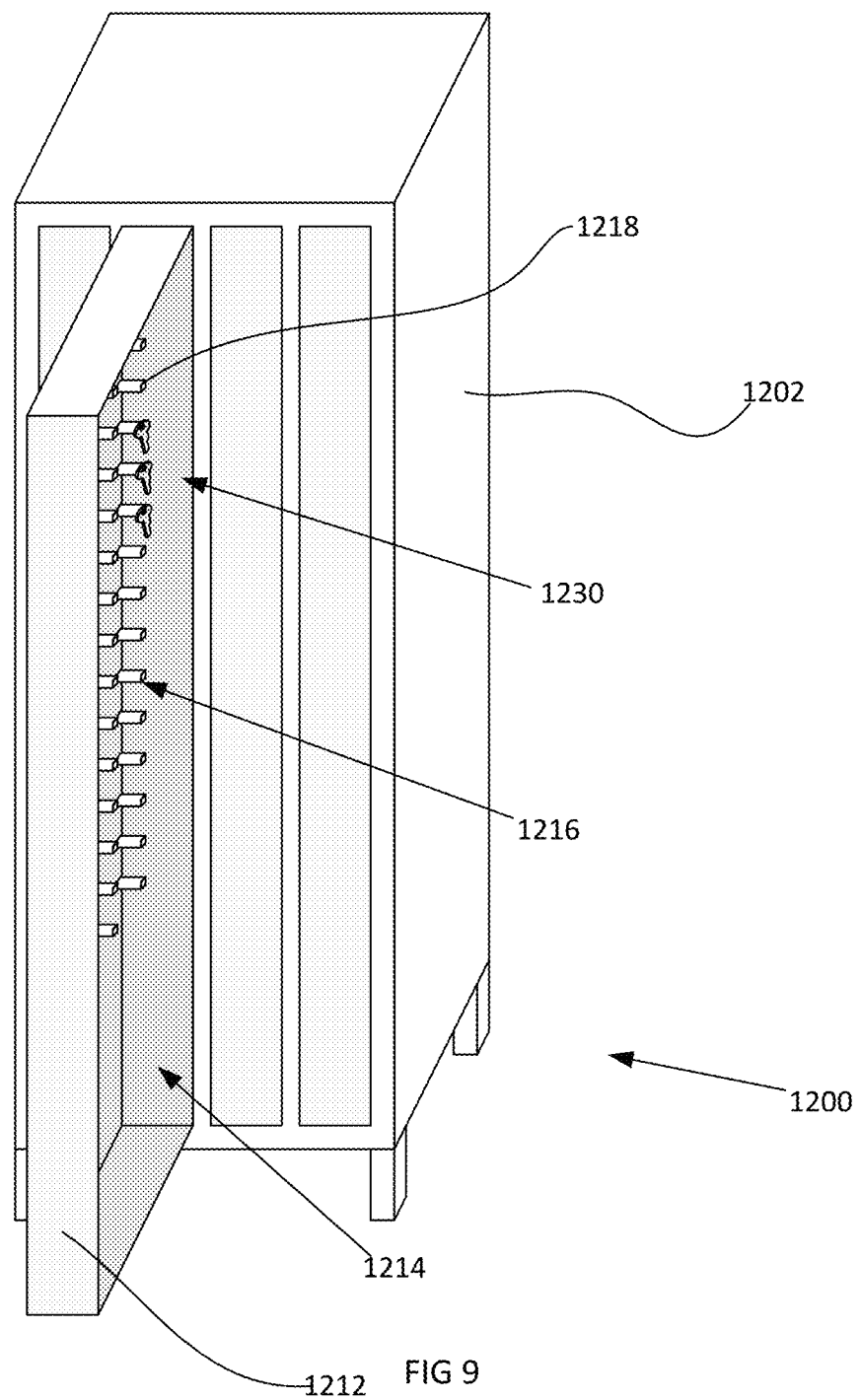

With reference now to FIGS. 8 and 9, views of a key scanning and cutting system 1000 comprising a key scanning and cutting apparatus 1100 and key stock storage system 1200 are provided. The key scanning and cutting apparatus 1100 may be the key scanning and cutting system described hereinabove with reference to the processes described in FIGS. 4-7. The key scanning and cutting apparatus 1100 comprises a main body or housing 1102 on the front or face of which a user interface or display 1110, a set of user interface elements 1112, a key cutting opening 1120, and a key scanning opening 1130 are disposed.

The user interface 1110 provides for the display of information, instructions, and for the input of user command related to functions or services provided by the key scanning and cutting apparatus 1100 including the scanning, selecting, cutting, and ordering of replacement or cut keys for a customer's master key. The scanning opening 1130 may further comprise a scanning surface 1132 which may be a glass plate. In some embodiments, the scanning opening 1130 may be covered by a door or may be disposed in a slidable drawer in the housing 1102 of the key scanning and cutting apparatus 1100.

A customer's key to be scanned is placed in the scanning opening 1130 and the scanning apparatus 1140 captures a 3D profile of the customer's master key. A clamping apparatus 1160 may be used to secure and position the master key to be scanned using a clamping opening or key slot 1162. A set of lasers, which may comprise one or more lasers 1144 and 1148, may be positioned on tracks 1146 and 1150 to be used to project or emit a laser line onto the key blade of the master key. The tracks 1146 and 1150 may be tracks, arms, or other suitable positioning means for adjusting the position of the lasers 1144 and 1148 relative to the master key being scanned. An image capture device 1142, which may be a digital camera device, captures images of the laser line on the key blade for generating the 3D profile of the master key.

A key blank or key stock is placed in the key cutting opening 1120, which may be covered by a swinging or sliding door, for the key blank to be cut into a cut or replacement key based on the customer's master key. The key blank is retrieved from the key stock storage system 1200.

The key stock storage system 1200 comprises a set of vertical sliding drawers 1210 in the body or housing 1202 of the key stock storage system 1200. Each drawer, such as drawer 1212 has an interior space in which a plurality of storage locations 1216 are disposed. The storage locations 1216, such as storage peg 1218, may be pegs, hooks, slots, or containers capable of holding or storing one or more key blanks, such as key blanks 1230. The storage location 1216 may be removable and reorganizable such that an operator may configure the storage locations 1216 in any manner suitable to the operator, such as in a grid configuration.

Figure 10:
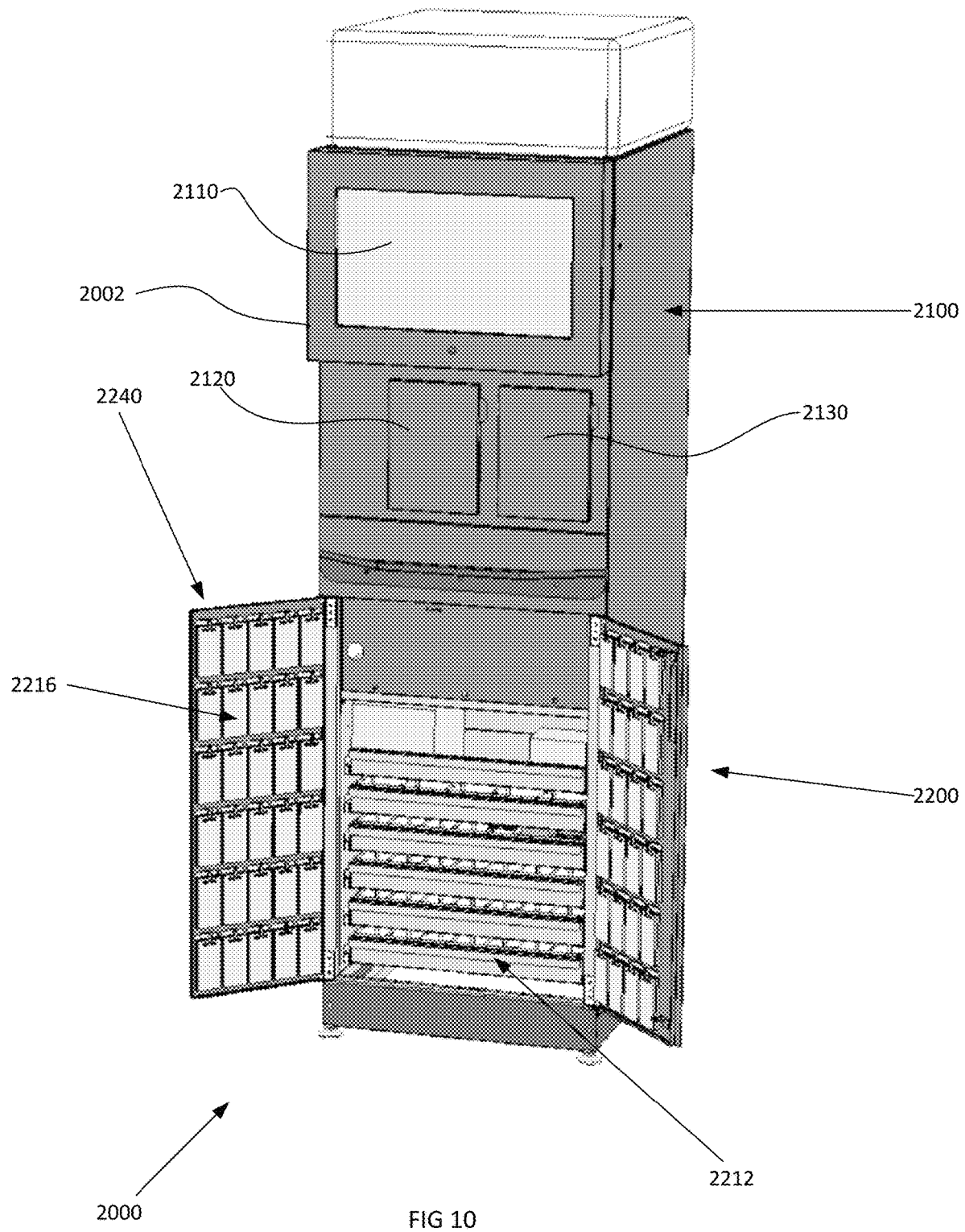
FIG. 10 provides a front perspective view of an embodiment of a key scanning and cutting system according to the present invention.

With reference now to FIG. 10, a perspective view of a key scanning and cutting system 2000 comprising a key scanning and cutting apparatus 2100 and key stock storage system 2200 are provided. The key scanning and cutting system 2000 comprises a single housing 2002 in which the key scanning and cutting apparatus 2100 and key stock storage system 2200 are disposed. The key scanning and cutting apparatus 2100 comprising the display and user interface 2110, first door 2120 which may be a key scanning opening, and second door 2130 which may be a key cutting opening is disposed above the key stock storage system 2200. A set of doors 2240 may open to provide access to the interior of the key stock storage system which may comprise a set of horizontal drawers 2212 having individual storage compartments or areas for holding key blanks or key stock, and a set of storage locations 2216 disposed on the interiors of the set of doors 2240. The set of storage locations 2216 may be a set of pegs or hooks including a set of magnetic or self-adhesive hooks secured to or installed on the interior of the set of doors 2240 in, for example, a grid configuration.

Figure 11:
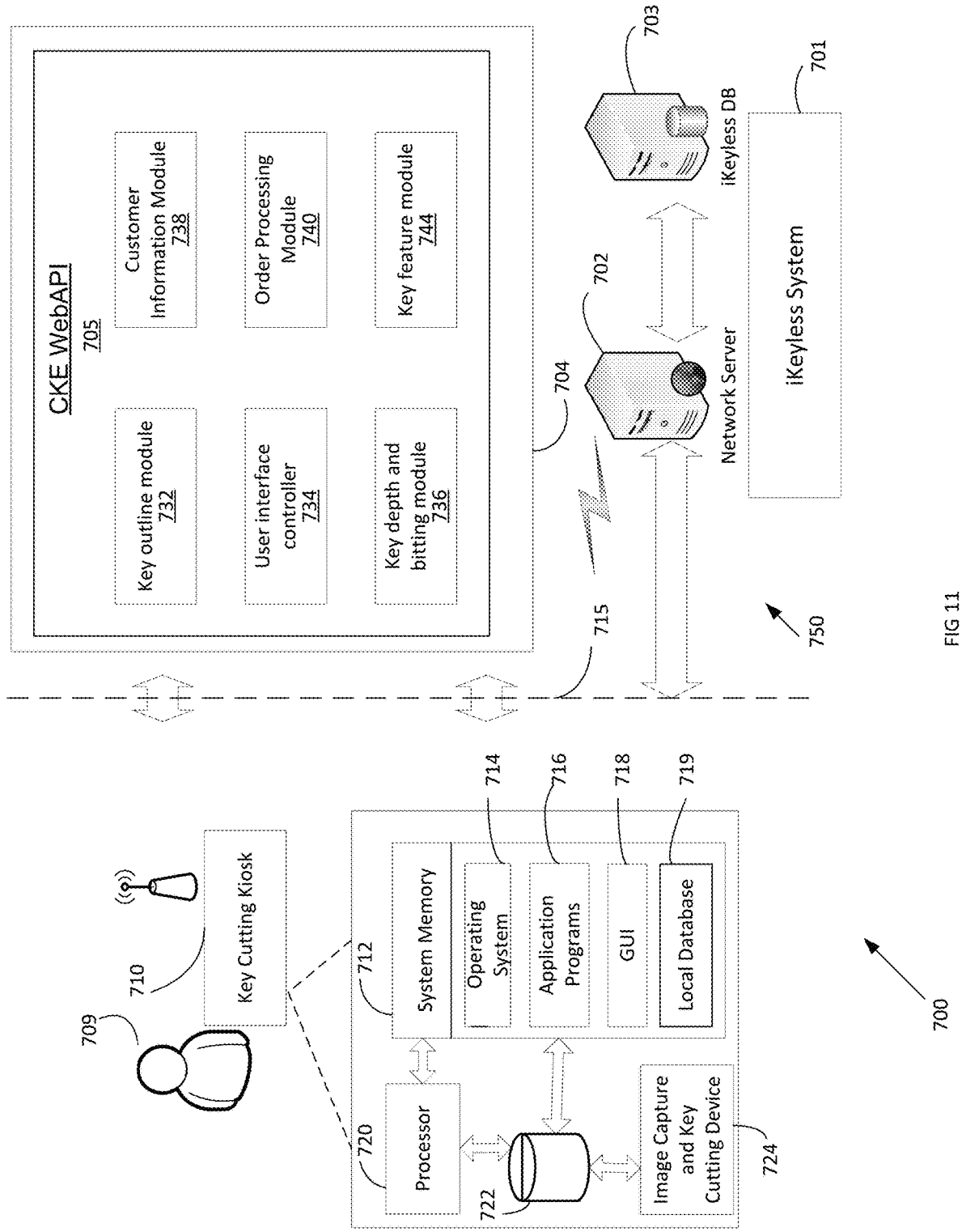
FIG. 11 provides a schematic of a key cutting service comprising a key cutting kiosk and a central facility having a web interface in accordance with an embodiment of the present invention.

FIG. 11 provides a schematic diagram of an exemplary system architecture configured to provide a user-interface driven process for identifying a master key, duplicating the master key and cutting a key blank, using the laser/image-driven system and processes described above. The system 700 may further include methods and processes enabling a user 709 to pair a duplicated key with a vehicle and connect to remote devices for exchanging data. With reference to FIG. 11, a system diagram for a system 700 for creating replacement vehicle keys according to the present invention is provided. The system 700 includes a kiosk or stand-alone key cutting station 710 such as described herein for being located at retail outlets, e.g., auto parts stores, big box stores, grocery stores and other facilities where key cutting services is desired. The key cutting kiosk may be connected to a central key cutting service operation, such as iKeyless System 701 over a communications network 715 for continuous or occasional connection to upload and/or download data and instructions associated with key cutting operation. The kiosk 710 may also be configured to be connected with mobile devices or other computing devices for local access and manipulation.

The system 700 includes, for example, an iKeyless or Car Keys Express WebAPI (Web Application Program Interface) 705 which may be part of a system environment 704 run on network server 702 and is the conduit, or interface, through which the remote kiosk 710 and the iKeyless System 701 sends and receives information to/from the iKeyless DB 703. The network server 702 may be in communication with the iKeyless database 703 which stores information used by the iKeyless System 701, including OEM key data for use by kiosk 710 and other connected machines to assist in making duplicate keys and in pairing keys with vehicles. For example, OEM and other key recognition information may be updated from time to time to freshen data stored locally at the kiosk 710. Also, transaction data associated with key cutting operations may be stored locally at the kiosk 710 and uploaded to System 701 such as for use in auditing sales data, inventory maintenance, machine maintenance, customer data and other valuable uses. The kiosk 710 may comprise a processor and a non-transitory memory which stores instructions that, when executed by the processor, transform the kiosk into a special purpose machine for key cutting operation. The iKeyless System 701 further comprises a key outline module 732, a customer information module 738, a user interface controller 734, an order processing module 740, a key depth and bitting module 736, and a key feature module 744, the features of which are discussed in further detail hereinbelow. The modules shown in system 704 may also, or a variation thereof, be stored locally at kiosk 710 for use in key cutting operations.

With the iKeyless System 701 in communication over communications network 715, such as a local area network, wide area network, or the Internet, with a distributed network of remote key cutting kiosks 710, data from the connected kiosks may be collected locally and maintenance may be performed in batch fashion to provide a network wide updating of programming and database assets. Each remote kiosk 710 is operated locally by a user 709, which may be a customer and/or a sales or service employee of the facility housing the kiosk. The remote kiosk 710 comprises a processor 720, system memory 712, local storage 722, and an image capture and key cutting device 724. Programs and software are loaded from the local storage 722 into the system memory 712 and may comprise an operating system 714, application programs 716, a graphical user interface ("GUI") 718, and local database 719. The GUIs stored at the kiosk include the user interfaces described herein in connection with FIGS. 8-16 and 21.

An application program 716 communicates with the local database 719 and provides a graphical user interface 718 that comprises a set of user interface elements for interacting with the application program. The WebAPI 705 provides a secure encrypted interface, exposed to the web, to/from which the remote access device application can send commands/requests and receive responses.

For example, the kiosk presents user interface 718 to a user 709 and receives information from the user to identify keys and select matching key blanks for copying and for handling programming and pairing of keys with vehicles. The image capture and key cutting device 724 includes laser and image capturing devices, such as for positioning and locating key features, and is adapted to capture images of master keys to be duplicated and applies image detecting, laser projection and processing algorithms to determine information, e.g., bitting information, about the master key, as is described hereinabove. The algorithms may include: the automatic detection of key features (e.g., tip, shoulder (if applicable), bottom, top, blade width, shoulder to tip distance); the auto-registration of a key image including the auto-rotation of the key, skew detection and auto-adjustment (detection of non-parallel key features) and auto-correction, stretch/compression detection (using, for example, known rules of shoulder to tip distance and blade width) and auto-correction; automatic detection of cut depths with comparison to the nominal cut depths for the detected bitting; automatic detection of key features and key bit cut depths that break key rules; and the comparison of key bitting of multiple pictures at once to verify bittings are the same through a series of photos.

The automatic algorithms can, without manual manipulation, extract key cut depths and key bitting data with a high degree of accuracy. Images captured and used for extracting key information including bitting information may be saved and stored. Key cutting and transaction data may be exported from the kiosk 710 via the iKeyless WebAPI 705 for centralized use.

Key cutting and pairing operation may also include use of a mobile application, e.g., compatible and compliant with Apple iOS and/or Android standards, downloadable on customer or sales personnel smart phones. The user may connect, such as with Bluetooth, with a programming device and handle pairing operations via instructions provided on their phone. Key information may be stored and uploaded to the central database 703 for later use, e.g., making additional duplicate keys without the need for a master key being present. This may be particularly useful in fleet management situations or when a user loses the master key. The mobile application may interface, e.g., via the iKeyless WebAPI 705, to allow encrypted exchange of information, including a user interface for a user to create a new account or log into existing account, access previous orders for review of order progress or to re-order, take pictures of existing key, buy new keys, and buy upgrades to previous or existing key products. A user may order automotive keys or house keys through the mobile application.

Processing of the image or images of the master key to be copied comprises evaluating the image according to key bitting rules and determining if the key bittings determined from the image or images are within acceptable tolerances for a particular key type. This will eliminate invalid key bitting information from a damaged or worn master key from which a key blade copy may not be cut. If an invalid bitting is determined from an image of a master key, an outline of the master key as determined by the system may be modified to create the best possible outline. A master set of actual or "valid" key codes within a set of potential codes associated with key bitting positions and depths may be used to ascertain if acquired master key data is valid. If the captured image and associated data do not match an actual valid key code for an identified make, model and year for a vehicle then the system can issue a warning and stop short of cutting a duplicate key.

Figure 12:
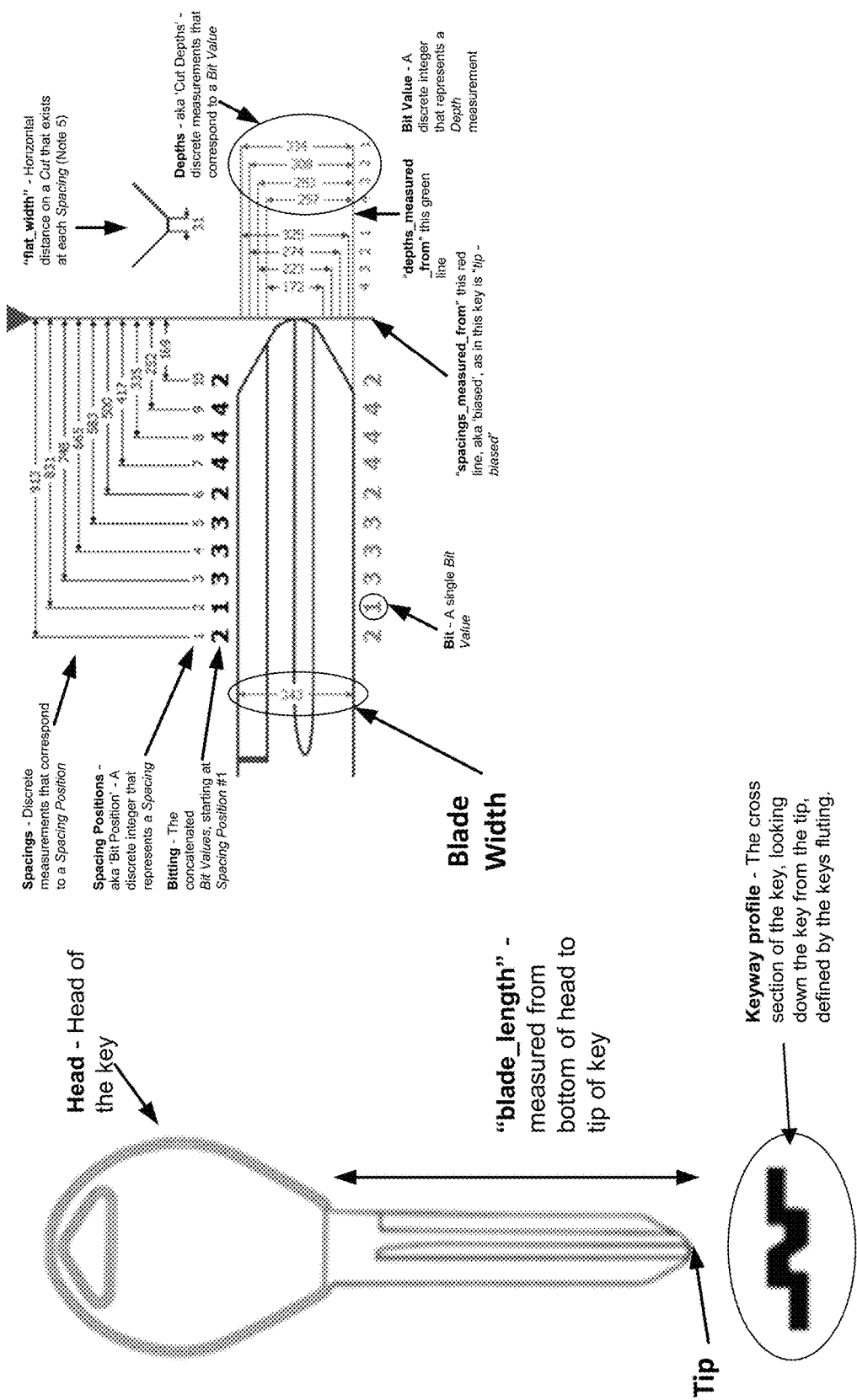
Figure 13:
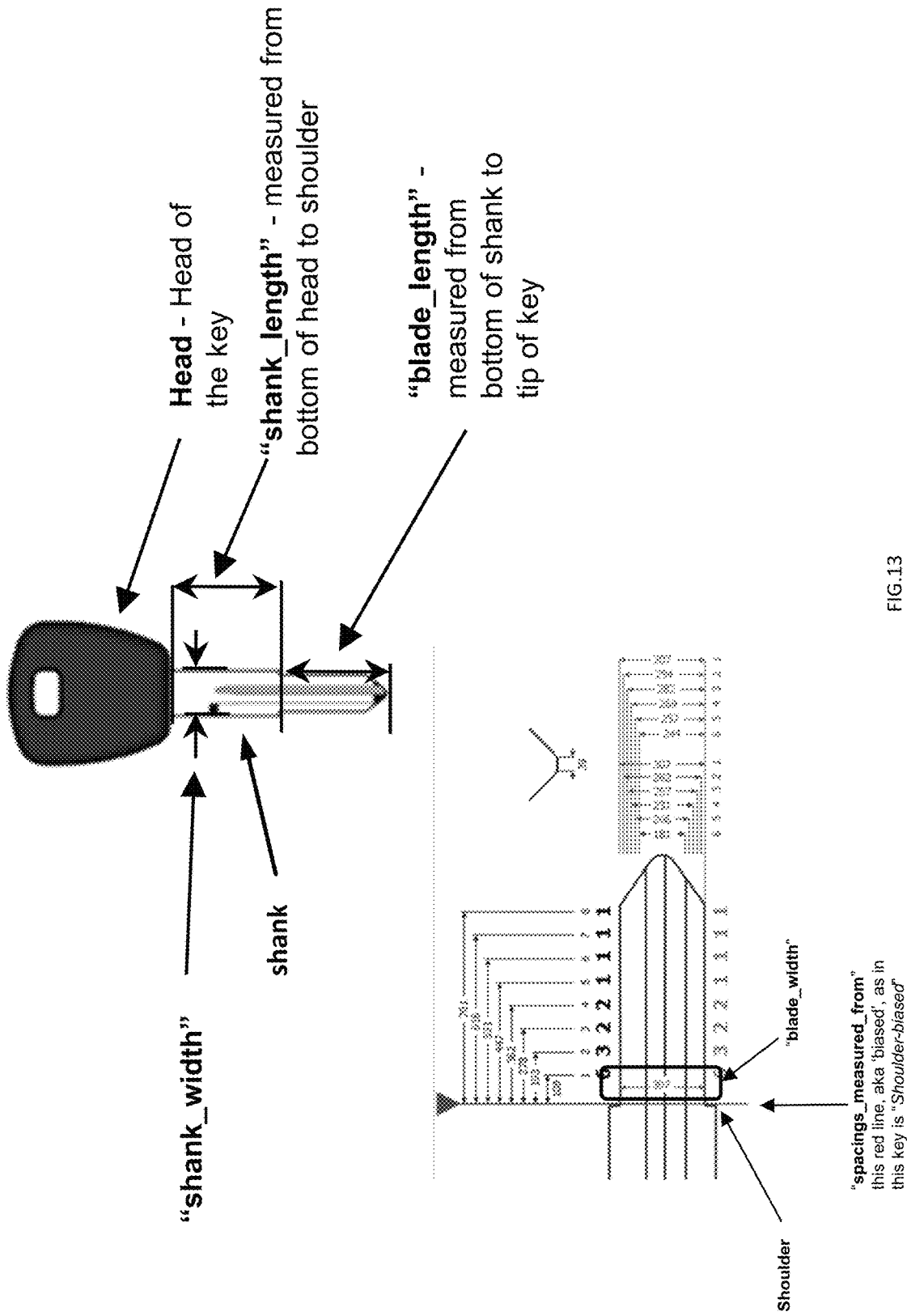

FIGS. 12-14 provide views of exemplary key types having key features and showing spacing and other criteria used in detecting positions, targeting lasers, and other key cutting operations. FIG. 12 illustrates an exemplary edge cut, tip-biased key type having a key head feature and a blade feature with an associated blade length and tip. An exemplary key profile is shown along with a set of spacing and bitting pattern and cutting criteria, e.g., depth of cut. FIG. 13 illustrates an exemplary shoulder-biased key type having a key head feature, a shank feature, a shoulder feature, and a blade feature with an associated blade length and tip. An exemplary set of spacing and bitting pattern and cutting criteria are also illustrated. FIG. 14 illustrates an exemplary high security (HS) tip-biased, double-sided key type having a blade feature with an associated blade length and tip. An exemplary key profile is shown along with a set of spacing and bitting pattern and cutting criteria.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A method for making duplicate keys comprising the following steps:
   receiving on a scannable surface a physical "master" key having a key blade;
   capturing image data of the master key;
   targeting a laser and projecting at least one laser line on the master key key blade based at least in part on captured image data;
   determining a set of measurements including distance and height measurements related to the master key and the at least one projected laser line;
   based on the determined set of measurements, determining a pitch angle of the master key key blade relative to the scannable surface; and
   targeting the laser and projecting a further laser line based at least in part on the set of measurements and the pitch angle.

2. The method of claim 1, wherein capturing image data comprises capturing a first image of the master key and identifying a predetermined location of the master key key blade; and wherein targeting a laser comprises, based on the first image, targeting a laser at a first location near the predetermined location of the master key key blade and projecting a first laser line on the master key key blade.

3. The method of claim 2, wherein capturing image data comprises capturing a first sequence of images of the projected first laser line on the master key key blade, and wherein determining a set of measurements comprises determining by a processor a first horizontal distance from an end tip of the master key key blade to the projected first laser line, the end tip being distal to the predetermined location, and determining by the processor a first blade height of the master key key blade.

4. The method of claim 3, wherein targeting a laser and projecting at least one laser line on the master key key blade comprises targeting by the laser, based at least in part on the first horizontal distance and the first blade height, a second location on the master key key blade and projecting a second laser line on the master key key blade, wherein the second location is either a point half-way between the first laser line and the tip of the key blade or a point half-way between the first laser line and the predetermined location.

5. The method of claim 4, wherein capturing image data comprises capturing a second sequence of images of the projected second laser line on the master key key blade, and wherein determining a set of measurements comprises determining a second horizontal distance from the end tip of the master key key blade to the second laser line and determining a second blade height of the master key key blade based on the second laser line.

6. The method of claim 5, wherein determining a pitch angle of the master key key blade relative to the scannable surface is based upon the first horizontal distance, the first blade height, the second horizontal distance, and the second blade height.

7. The method of claim 6, wherein targeting the laser and projecting a further laser line based at least in part on the set or measurements and the pitch angle comprises targeting by the laser, based at least in part on the first and second horizontal distances, the first and second blade heights, and the pitch angle, a third location on the master key key blade and projecting a third laser line on the master key key blade.

8. The method of claim 7 further comprising moving the third laser line along the length of the master key key blade and capturing a third sequence of images of the projected third laser line on the master key key blade.

9. The method of claim 8, wherein for the third sequence of images an apparent distance moved between each captured image is corrected to about 1 pixel between exposures or image captures.

10. The method of claim 1 further comprising generating a three-dimensional profile of the master key key blade.

11. The method of claim 1, wherein targeting the laser and projecting a further laser line comprises controlling a speed of movement of the further laser line based on the determined pitch angle.

12. The method of claim 1 further comprising correcting distorted image data and simulating sliding pins over cuts in the master key key blade.

13. The method of claim 12 further comprising determining an optimum position for decoding and decoding the master key key blade at a determined best slide position.

14. The method of claim 13 further comprising decoding both sides of a master key key blade, applying a best fit line, sum errors from applying best fit line to determine a score, and determine which side has the lowest error score.

15. The method of claim 14 further comprising comparing the lowest error score to a pass/fail value and determine whether to cut a key blank to trace or to code.

\* \* \* \* \*